United States Patent
Sakuramoto

(10) Patent No.: US 9,716,556 B2
(45) Date of Patent: Jul. 25, 2017

(54) OPTICAL RECEIVING DEVICE AND TRANSMISSION DEVICE

(71) Applicant: FUJITSU OPTICAL COMPONENTS LIMITED, Kawasaki-shi, Kanagawa (JP)

(72) Inventor: Shinichi Sakuramoto, Kawasaki (JP)

(73) Assignee: FUJITSU OPTICAL COMPONENTS LIMITED, Kawasaki (JP)

( * ) Notice: Subject to any disclaimer, the term of this patent is extended or adjusted under 35 U.S.C. 154(b) by 32 days.

(21) Appl. No.: 14/494,900

(22) Filed: Sep. 24, 2014

(65) Prior Publication Data

US 2015/0117863 A1 Apr. 30, 2015

(30) Foreign Application Priority Data

Oct. 31, 2013 (JP) ................................ 2013-227626

(51) Int. Cl.
*H04B 10/69* (2013.01)
*H04B 10/272* (2013.01)

(52) U.S. Cl.
CPC ....... *H04B 10/6933* (2013.01); *H04B 10/272* (2013.01)

(58) Field of Classification Search
CPC ............. H03F 3/08; H03F 2203/45212; H03F 2203/45588; H04B 10/60; H04B 10/68; H04B 10/697
USPC ........................................................ 398/212
See application file for complete search history.

(56) References Cited

U.S. PATENT DOCUMENTS

| 4,731,721 A | * | 3/1988 | Igashira | H02H 7/003 363/131 |
| 5,798,664 A | * | 8/1998 | Nagahori | H03F 3/087 327/307 |
| 5,875,049 A | * | 2/1999 | Asano | H03F 3/08 250/214 A |

(Continued)

FOREIGN PATENT DOCUMENTS

| JP | 2009-38556 | 2/2009 |
| JP | 2009-246537 | 10/2009 |
| WO | 2012/102300 A1 | 8/2012 |

OTHER PUBLICATIONS

Chinese Office Action dated Nov. 4, 2016 in corresponding Chinese Patent Application No. 201410521218.1.

*Primary Examiner* — David Payne
*Assistant Examiner* — Tanya Motsinger
(74) *Attorney, Agent, or Firm* — Staas & Halsey LLP

(57) ABSTRACT

An optical receiving device includes: a conversion device that converts an input burst optical signal into a positive phase electrical signal and a negative phase electrical signal; an amplification device that amplifies the positive phase electrical signal and the negative phase electrical signal; a first output terminal that outputs the positive phase electrical signal; a second output terminal that outputs the negative electrical signal; a first transmission line that couples the amplification device with the first output terminal and transmits the positive phase electrical signal; a second transmission line that couples the amplification device with the second output terminal and transmits the negative phase electrical signal; and a control device that reduces a potential difference between the first transmission line and the second transmission line in a no-signal period that is provided between burst optical signals.

10 Claims, 26 Drawing Sheets

(56) References Cited

U.S. PATENT DOCUMENTS

| | | | | |
|---|---|---|---|---|
| 6,232,842 B1* | 5/2001 | Asano | H03F 3/087 250/214 A | |
| 6,907,202 B1* | 6/2005 | Ide | H03G 3/3084 398/208 | |
| 7,394,996 B2* | 7/2008 | Duanmu | H04B 10/695 398/202 | |
| 7,746,150 B2* | 6/2010 | Wong | H03K 19/007 327/335 | |
| 8,478,138 B2* | 7/2013 | Sugawara | H04B 10/677 398/202 | |
| 8,653,433 B2* | 2/2014 | Mashimo | H03F 1/083 250/214 AG | |
| 2004/0232970 A1* | 11/2004 | Mochizuki | H03F 3/45475 327/333 | |
| 2004/0233090 A1* | 11/2004 | Miyasita | H04L 25/062 341/155 | |
| 2009/0284315 A1* | 11/2009 | Kobayashi | H03F 1/08 330/253 | |
| 2010/0067924 A1* | 3/2010 | Noda | H03G 3/3084 398/202 | |
| 2010/0284703 A1* | 11/2010 | Suzuki | H01L 31/02019 398/212 | |
| 2012/0281991 A1* | 11/2012 | Sugimoto | H03F 3/087 398/208 | |
| 2013/0082776 A1* | 4/2013 | Sugimoto | H03F 1/083 330/254 | |
| 2013/0279905 A1* | 10/2013 | Brown | H03K 5/1252 398/37 | |
| 2014/0016949 A1* | 1/2014 | Koizumi | H04B 10/69 398/212 | |
| 2014/0029958 A1* | 1/2014 | Takahashi | H04B 10/60 398/202 | |
| 2015/0117863 A1* | 4/2015 | Sakuramoto | H04B 10/6933 398/116 | |
| 2015/0163010 A1* | 6/2015 | Umeda | H04B 10/272 398/98 | |
| 2015/0372648 A1* | 12/2015 | Sugimoto | H04B 10/272 330/2 | |

\* cited by examiner

FIG. 3

| | STANDARD | | |
|---|---|---|---|
| | IEEE 802.3av | ITU-T G.987.2 | ITU-T G.984.2 |
| UPBOUND BIT RATE | 1.25Gbps / 10.3Gbps | 2.488Gbps | 1.244Gbps |
| GUARD TIME | 1024ns (1280bits) / 1024ns (10560bits) | 25.6ns (64bits) | 25.6ns (32bits) |
| RECEIVER SETTLING TIME (MAXIMUM VALUE) | 400ns (500bits) / 800ns (8250bits) | TARGET VALUE: 64ns (160bits) WORST VALUE: 742ns (1856bits) | 35.4ns (44bits) |
| CONSECUTIVE IDENTICAL DIGITS RESISTANCE | 5bits / 66bits | 72bits | 72bits |

FIG. 9

| SPEC OF ITU-T G.987.2 | UPBOUND BIT RATE | 2.488 (Gbps) | | |
|---|---|---|---|---|
| | RECEIVER SETTLING TIME (MAXIMUM VALUE) | 160 (bits) [TARGET VALUE]<br>1856 (bits) [WORST VALUE] | | |
| | CONSECUTIVE IDENTICAL DIGITS RESISTANCE | 72 (bits) | | |
| | PENALTY | 0.5 (dB) | 1.0 (dB) | 3.0 (dB) |
| | ESTIMATE OF RECEIVER SETTLING TIME | 4257 (bits) | 1577 (bits) | 250 (bits) |
| | CAPACITANCE OF COUPLING CAPACITOR | 5.6 (nF) | 2.7 (nF) | 8.2 (nF) |

OPTICAL RECEIVING DEVICE AND TRANSMISSION DEVICE

CROSS-REFERENCE TO RELATED APPLICATION

This application is based upon and claims the benefit of priority of the prior Japanese Patent Application No. 2013-227626, filed on Oct. 31, 2013, the entire contents of which are incorporated herein by reference.

FIELD

A certain aspect of embodiments described herein relates to an optical receiving device and a transmission device.

BACKGROUND

Because of increase of telecommunication needs, an optical line such as a PON (Passive Optical Network) is spread as a subscriber telecommunication line instead of a metal line such as an ADSL (Asymmetric Digital Subscriber Line). The PON is an access-based optical network in which an optical terminal station device and a plurality of optical terminal devices are coupled with each other via an optical coupler (star coupler) branching a light, as disclosed in Japanese Patent Application Publication No. 2009-246537 (hereinafter referred to as Document 1).

The optical terminal station device is called an OLT (Optical Line Termination) or the like and is a transmission device provided in a station of an optical telecommunication service provider. The optical terminal device is called an ONU (Optical Network Unit) or an ONT (Optical Network Termination) or the like and is a transmission device provided in a subscriber of the optical telecommunication service. A transmission direction from the ONU to the OLT is defined as an upbound direction. A transmission direction from the OLT to ONU is defined as a downbound direction.

The optical coupler couples a single OLT with 32 ONUs, for example. Thus, the optical coupler achieves an optical network structure having a star type topology. One of advantages of the PON is to reduce the number of optical fibers (transmission lines) provided between a station and subscriber houses with use of the star type topology.

The OLT and ONU transmit a signal with a transmission speed of 1.25 Gbps or the like in the upbound direction and the downbound direction. The PON having the transmission speed of 1.25 Gbps is regulated as a G (Gigabit-capable)-PON in ITU-T (International Telecommunication Union Telecommunication Standardization Sector) recommendation G984 series. On the other hand, the PON having the same transmission speed based on an Ethernet technology is regulated as 1000 Base-PX20 (PX10) in IEEE (the Institute of Electrical and Electronics Engineers, Inc.) 802.3ah. The PON of 1000 BASE-PX20 (PX10) is called a GE (Gigabit Ethernet)-PON or the like.

Recently, further increase of the telecommunication needs is estimated. Therefore, the PON technology that has an upbound direction transmission speed and a downbound direction transmission speed of 2.5 Gbps and 10 Gbps and achieves a large capacity transmission is being developed. The technology is regulated as an XG (10-Gigabit-capable)-PON in ITU-T recommendation G987 series. On the other hand, the 10GE (10-Gigabit Ethernet)-PON having an upbound direction of 2.5 Gbps or 10 Gbps and a downbound direction of 10 Gbps is regulated in IEEE 802.3ay.

A downbound signal from the OLT to each ONU is processed for transmission by a TDM (Time Divisional Multiplexing) method as a continuous signal in which data for each ONU are continuously arranged. On the other hand, an upbound signal from each ONU to the OLT is processed for transmission based on an individual transmission timing instructed from the OLT to each ONU in advance so that each signal does not collide because the optical coupler and the OLT is coupled with a single optical fiber.

A guard time (no-signal period) that has a predetermined length and is determined based on on-off time of a transmission laser is provided between upbound signals adjacent to each other in order to suppress collision of the upbound signals. Therefore, the upbound signal is processed for transmission by a TDMA (Time Division Multiple Access) as a burst optical signal.

The OLT has an optical receiving device (burst receiving device) that receives a burst optical signal transmitted from each ONU. Amplifiers in the optical receiving devices are AC (Alternative Current) coupled with each other. That is, the amplifiers are coupled by a coupling capacitor. Or, the optical receiving device is coupled with a rear re-timing circuit by the AC coupling. When the AC coupling is used, it is not necessary to adjust output voltage levels of a positive phase electrical signal and a negative phase electrical signal obtained by conversion of the burst optical signal to an input level of a device to which the electrical signals are output, being different from a DC coupling. Therefore, a general electric device can be used, and a cost can be reduced.

Regarding an optical receiving device, for example, Document 1 discloses a technology that a section between bursts of a burst signal is detected, and an offset compensation is automatically performed. Japanese Patent Application Publication No. 2009-38556 discloses a technology that a DC offset voltage of a differential output signal of a differential amplification circuit is adjusted.

SUMMARY

According to an aspect of the present invention, there is provided an optical receiving device including: a conversion device that converts an input burst optical signal into a positive phase electrical signal and a negative phase electrical signal; an amplification device that amplifies the positive phase electrical signal and the negative phase electrical signal; a first output terminal that outputs the positive phase electrical signal; a second output terminal that outputs the negative electrical signal; a first transmission line that couples the amplification device with the first output terminal and transmits the positive phase electrical signal; a second transmission line that couples the amplification device with the second output terminal and transmits the negative phase electrical signal; and a control device that reduces a potential difference between the first transmission line and the second transmission line in a no-signal period that is provided between burst optical signals.

According to another aspect of the present invention, there is provided an optical receiving device including: a conversion device that converts an input burst optical signal into a positive phase electrical signal and a negative phase electrical signal; an amplification device that amplifies the positive phase electrical signal and the negative phase electrical signal; a first transmission line that couples the conversion device with the amplification device via a first capacitor and transmits the positive phase electrical signal; a second transmission line that couples the conversion device with the amplification device via a second capacitor and transmits the negative phase electrical signal; and a control device that reduces a potential difference between a portion of the first transmission line between the conversion device and the first capacitor and a portion of the second transmission line between the conversion device and the second capacitor in a no-signal period that is provided between burst optical signals.

According to another aspect of the present invention, there is provided a transmission device including: a conversion device that converts an input burst optical signal into a positive phase electrical signal and a negative phase electrical signal; an amplification device that amplifies the positive phase electrical signal and the negative phase electrical signal; a signal processing device that processes the positive phase electrical signal and the negative phase electrical signal that are amplified by the amplification device; a first transmission line that couples the amplification device with the signal processing device via a first capacitor and transmits the positive phase electrical signal; a second transmission line that couples the amplification device with the signal processing device via a second capacitor and transmits the negative phase electrical signal; and a control device that reduces a potential difference between a portion of the first transmission line between the amplification device and the first capacitor and a portion of the second transmission line between the amplification device and the second capacitor in a no-signal period that is provided between burst optical signals.

According to another aspect of the present invention, there is provided a transmission device including: a conversion device that converts an input burst optical signal into a positive phase electrical signal and a negative phase electrical signal; an amplification device that amplifies the positive phase electrical signal and the negative phase electrical signal; a signal processing device that processes the positive phase electrical signal and the negative phase electrical signal that are amplified by the amplification device; a first transmission line that couples the conversion device with the amplification device via a first capacitor and transmits the positive phase electrical signal; a second transmission line that couples the conversion device with the amplification device via a second capacitor and transmits the negative phase electrical signal; and a control device that reduces a potential difference between a portion of the first transmission line between the conversion device and the first capacitor and a portion of the second transmission line between the conversion device and the second capacitor in a no-signal period that is provided between burst optical signals.

The object and advantages of the invention will be realized and attained by means of the elements and combinations particularly pointed out in the claims. It is to be understood that both the foregoing general description and the following detailed description are exemplary and explanatory and are not restrictive of the invention, as claimed.

BRIEF DESCRIPTION OF DRAWINGS

FIG. 3 illustrates a specification of a burst optical signal that is determined in accordance with an international standard;

FIG. 9 illustrates an estimate of the receiving settling time with respect to a specification of ITU-T recommendation G987.2;

DESCRIPTION OF EMBODIMENTS

When an AC coupling is used, a reference value of a voltage level of a positive phase electrical signal and a negative phase electrical signal fluctuates for a given time from a start of optical receiving because of influence of a guard time (no-signal period) between burst optical signals. This is because a direct current component of an output voltage of a device outputting an electrical signal during the no-signal period is cut-off from a circuit to which the electrical signal is input by a cutoff frequency of a coupling capacitor. And, the voltage of the direct current component becomes a voltage level of the device itself. This fluctuation results in unequilibrium between reference values of the positive phase electrical signal and the negative phase electrical signal.

Data identification of the burst optical signal is not possible for a period in which the reference value of the voltage level fluctuates. Therefore, a preamble section having a length longer than a settling time is provided at a head of the burst optical signal. The preamble section degrades a band efficiency in an upbound direction in order to use a given transmission band.

The period in which the data identification is not possible depends on a time constant based on the impedance of a transmission line and the capacitance value of a coupling capacitor. Therefore, when the capacitance value of the coupling capacitor is reduced, the period can be reduced and the band efficiency can be improved.

However, when the capacitance value of the coupling capacitor is reduced, interference between successive identical sign data in the burst optical signal is enhanced. Therefore, degradation of receiving sensitivity and error of the sign identification may occur, and transmission quality may be degraded. That is, the band efficiency and the transmission quality have a trade-off relation in the upbound direction of the PON.

Figure 1:
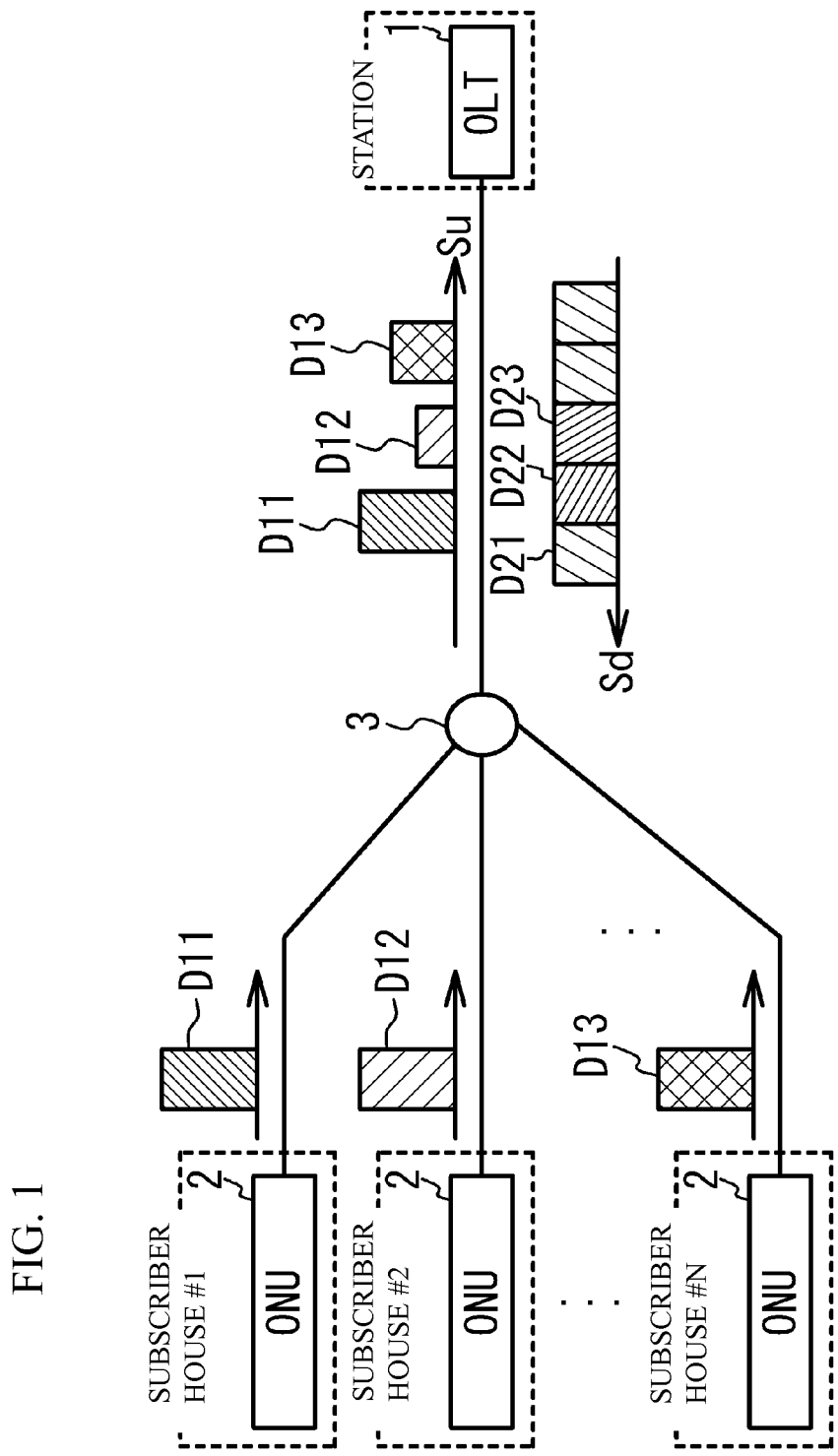
FIG. 1 illustrates a schematic view of a structure of a PON.

The following is a description of embodiments, with reference to the accompanying drawings. FIG. 1 illustrates a schematic view of a structure of a PON. The PON is one of access-based networks, and has an optical terminal station device (OLT) 1, a plurality of optical terminal devices (ONU) 2 and an optical coupler (star coupler) 3.

The optical terminal station device 1 is a transmission device that is provided in a base station of a provider of an optical telecommunication service. The plurality of optical terminal devices 2 are transmission devices that are provided in houses #1 to #N (N is 32 for example) of subscribers of the optical telecommunication service. In the embodiment, a transmission direction from the optical terminal device 2 to the optical terminal station device 1 is defined as an upbound direction. A transmission direction from the optical terminal station device 1 to the optical terminal device 2 is defined as a downbound direction.

The optical terminal station device 1 and the plurality of the optical terminal devices 2 are coupled to an optical coupler 3 via an optical fiber (a transmission line). Therefore, the PON has a star type topology. The optical coupler 3 is a device to multiplex or de-multiplex an optical signal, and is for example, provided in a tool box of a power pole near each of subscriber houses #1 to #N. Therefore, lengths of a plurality of optical fibers between the optical coupler 3 and the optical terminal device 2 of each of the subscriber houses #1 to #N is larger than a length of an optical fiber between the optical coupler 3 and the optical terminal station device 1.

The number of optical fiber provided between the optical coupler 3 and the optical terminal station device 1 is one. Therefore, optical fiber cost in the PON is lower than optical fiber cost in a network in which a media convertor is connected to a station side transmission device by one-on-one.

The optical terminal station device 1 generates a downbound signal Sd from data signals D21 to D23 that are received from a backbone network and are transmitted to each optical terminal device 2, and transmits the downbound signal Sd to the optical terminal device 2 of each of the subscriber houses #1 to #N. The downbound signal Sd is generated as a continuous signal based on a TDM method.

The optical terminal device 2 of each of the subscriber houses #1 to #N receives a common downbound signal Sd, extracts the data signals D21 to D23 of which destination is the optical terminal device 2 based on an identifier included in the data signals D21 to D23 in the downbound signal Sd and disposes other data signals. For example, the optical terminal device 2 of the subscriber house #1 extracts the data signal D21 from the downbound signal Sd. The optical terminal device 2 of the subscriber house #2 extracts the data signal D22 from the downbound signal Sd. The optical terminal device 2 of the subscriber house #N extracts a data signal D23 from the downbound signal Sd.

In this manner, in the downbound direction, the optical terminal device 2 of each of the subscriber houses #1 to #N receives not only data signals D21 to D23 of which destination is the optical terminal device 2 but also data signals D21 to D23 of which destination is another optical terminal device 2. Therefore, the optical terminal station device 1 encrypts the downbound signal Sd with AES (Advanced Encryption Standard) or the like and transmits the encrypted downbound signal Sd. In this case, the optical terminal device 2 of each of the subscriber houses #1 to #N receives an individual encryption key from the optical terminal station device 1. Therefore, the optical terminal device 2 of each of the subscriber houses #1 to #N is capable of normally receiving only the data signals D21 to D23 of which destination is the optical terminal device 2.

On the other hand, in an upbound direction, the optical terminal device 2 of each of the subscriber houses #1 to #N transmits data signals D11 to D13 received from a user network based on an individual transmission timing instructed by the optical terminal device 2 in advance. Therefore, the upbound signal Su is transmitted as a burst optical signal based on a TDMA method.

Therefore, a collision of the data signals D11 to D13 of each optical terminal device 2 between the optical coupler 3 and the optical terminal station device 1 is avoided. In the following description, the data signals D11 to D13 included in the upbound signal Su is referred to as a burst optical signal Su.

Optical levels of the burst optical signals Su are different from each other because distances between the optical terminal station device 1 and the optical terminal devices 2 are different from each other. The optical terminal station device 1 amplifies the burst optical signals Su of which optical levels are different from each other to electrical signals having a predetermined level.

Figure 2:
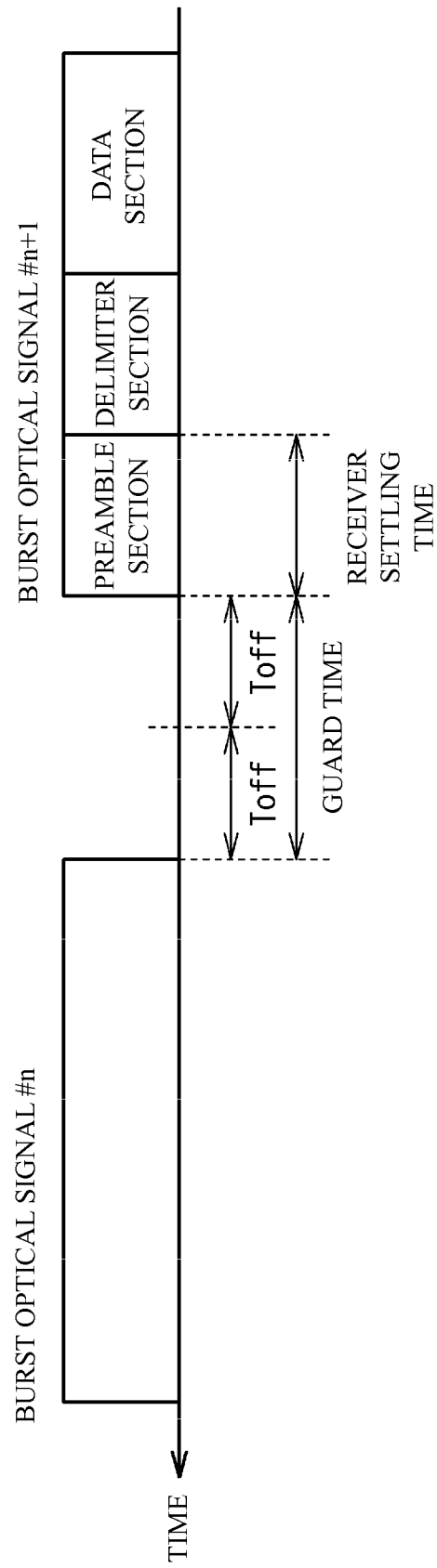
FIG. 2 illustrates a structure diagram of a burst optical signal.

FIG. 2 illustrates a structure diagram of the burst optical signals Su. A period without signal named a guard time is provided between adjacent burst optical signals (#n and #n+1). The guard time includes a rising time (on time) Ton and a falling time (off time) of a laser output by an optical transmitter (burst transmitter) of the optical terminal device 2 and is provided in order to avoid a collision of the burst optical signals Su. The guard time is also determined in view of phase changing of the burst optical signal Su caused by environmental changing such as temperature changing.

The burst optical signal Su includes a preamble section, a delimiter section, and a data section. The preamble section protects a data constant period caused by changing of a reference value of the voltage level of the burst optical signal Su because of the guard time (no-signal period) as described later. The preamble section is composed of alternating patterns of "0" and "1" of binary digit. The preamble section has a time length to determine a received data code, that is a receiver settling time. The preamble section occupies a part of an upbound band. Therefore, the longer the receiver settling time is, the lower the band efficiency of the upbound direction is.

The delimiter section has a fixed pattern that is used for determining an front edge of a rear data section. The data section stores a user data and has an Ethernet frame or the like.

FIG. 3 illustrates a specification of a burst optical signal Su that is determined in accordance with an international standard. The international standard is, for example, IEEE802.3av, ITU-T recommendation G.987.2, ITU-T recommendation G.984.2, or the like.

FIG. 3 illustrates an upbound bit rate, Ton/Toff, a guard time, a receiver settling time (maximum value) and consecutive identical digits resistance that are regulated by each standard. The consecutive identical digits resistance indicates a bit number allowing normal receiving in a case where identical codes ("0" or "1" of binary digit) continue. Regarding the Ton/Toff, the guard time and the receiver settling time, values in brackets indicate a time converted into bit numbers (bits) based on the upbound bit rate.

With respect to the Ton/Toff, the guard time and the receiver settling time, the values of the ITU-T recommendation G.987.2 and the ITU-T recommendation G.984.2 are smaller than values of IEEE802.3av. Therefore, the time length of the guard time and the preamble section with reference to the ITU-T is shorter than the spec of IEEE.

Regarding the consecutive identical digits, the values of the ITU-T recommendation G.987.2 and the ITU-T recommendation G.984.2 are larger than the values of IEEE802.3av. In this manner, the spec of the ITU-T is stricter than that of the IEEE. Optical receiving devices in the following embodiments maintains the consecutive identical digits resistance to be equal to or more than a predetermined value so that the spec of the ITU-T recommendation G.987.2 is satisfied, and reduces the receiver settling time.

Figure 4:
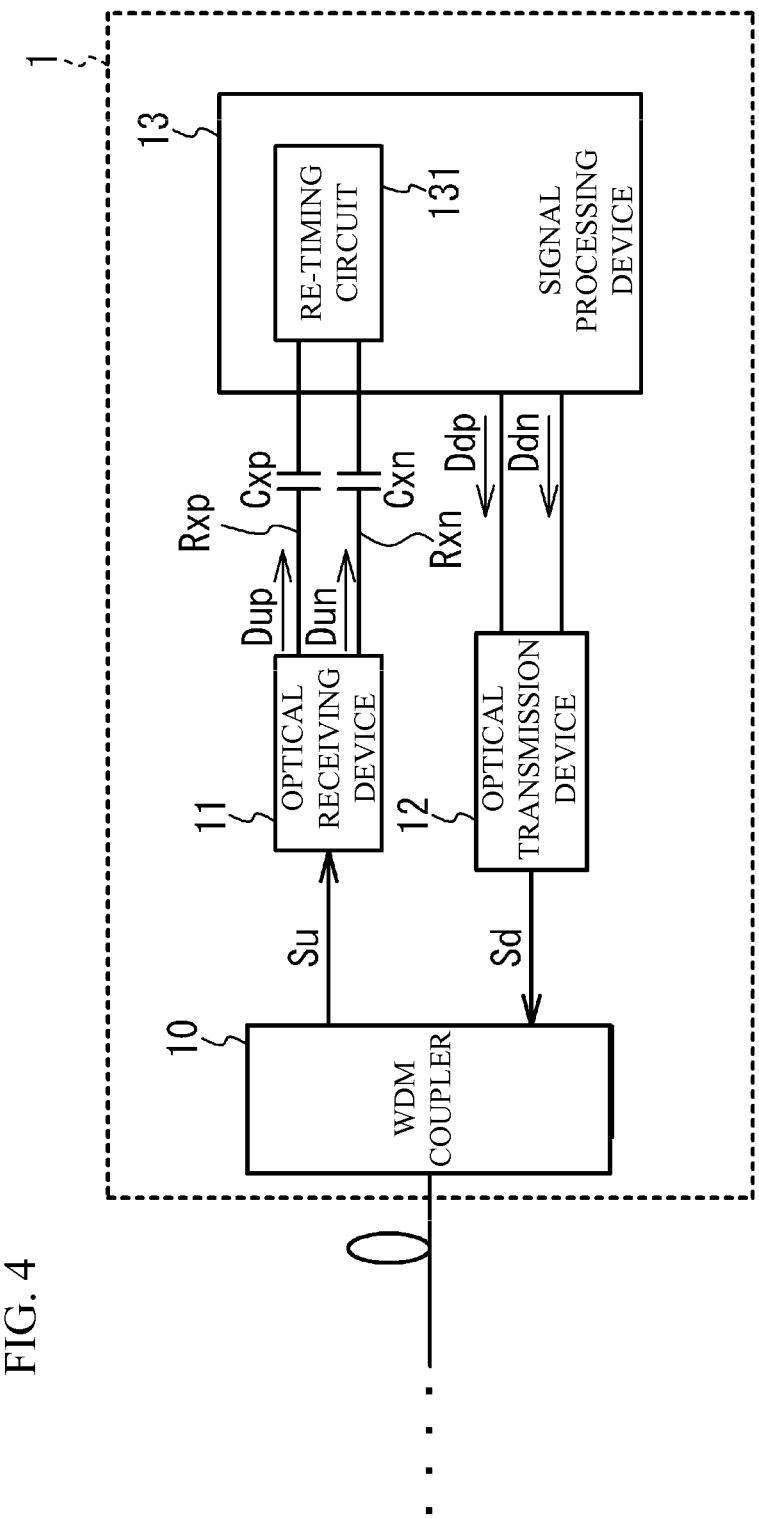
FIG. 4 illustrates a functional structure of an optical terminal device.

Next, a description will be given of a structure of an optical receiving device. FIG. 4 illustrates a functional structure of the optical terminal station device 1.

The optical terminal station device 1 has a WDM (Wavelength Division Multiplexing) coupler 10, an optical receiving device 11, an optical transmission device 12 and a signal processing device 13. The WDM coupler 10 is coupled with an optical fiber (a transmission line), the optical receiving device 11 and the optical transmission device 12.

The WDM coupler 10 is an optical device that de-multiplexes a light into lights having a different wavelength and multiplexes the lights having a different wavelength. For example, the WDM coupler 10 guides a burst optical signal Su that is input from an optical fiber and has a wavelength of 1.31 μm to the optical receiving device 11, and guides a burst optical signal Su that is input from the optical transmission device 12 and has a wavelength of 1.49 μm to the optical fiber.

The optical receiving device 11 receives a burst optical signal Su, generates a positive phase electrical signal Dup and a negative phase electrical signal Dun by a photoelectric conversion, and outputs the positive phase electrical signal Dup and the negative phase electrical signal Dun to the signal processing device 13. The signal processing device 13 performs a signal processing of the positive phase electrical signal Dup and the negative phase electrical signal Dun.

The positive phase electrical signal Dup and the negative phase electrical signal Dun are input into a re-timing circuit 131 in the signal processing device 13. The re-timing circuit 131 synchronizes the positive phase electrical signal Dup and the negative phase electrical signal Dun with a clock signal in the optical terminal station device 1 and outputs the synchronized electrical signals.

Between the optical receiving device 11 and the re-timing circuit 131, a transmission line Rxp of the positive phase electrical signal Dup has a coupling capacitor Cxp, and a transmission line Rxn of the negative phase electrical signal Dun has a coupling capacitor Cxn. That is, an AC coupling is established by the optical receiving device 11 and the re-timing circuit 131. With the AC coupling, it is not necessary to match an output level of a voltage of each of the positive phase electrical signal and the negative phase electrical signal of the optical receiving device 11 with an input level of the re-timing circuit 131. Therefore, usage of a general electrical component is possible, and thereby a cost can be reduced.

The signal processing device 13 performs a process of an OAM (Operation Administration and Maintenance) function such as an information detection, a determining process of an individual transmission timing to the optical terminal device 2, and so on. The signal processing device 13 generates a positive phase electrical signal Ddp and a negative phase electrical signal Ddn in a downbound direction from a data signal received from a backbone network (for example, a metro ring network), encrypts the positive phase electrical signal Ddp and the negative phase electrical signal Ddn, and outputs the encrypted signals to the optical transmission device 12. The optical transmission device 12 outputs a downbound signal Sd to an optical fiber via the WDM coupler. The downbound signal Sd is obtained by photoelectric conversion of the positive phase electrical signal Ddp and the negative phase electrical signal Ddn.

In this manner, the optical terminal station device 1 receives a burst optical signal Su in an upbound direction and transmits a downbound signal Sd via a common optical fiber (transmission line) with the WDM coupler 10. On the other hand, the optical terminal device 2 transmits a burst optical signal Su in an upbound direction and receives a downbound signal Sd via a common optical fiber (transmission line) with a WDM coupler as in the case of the optical terminal station device 1. Therefore, the PON reduces facility expenses of optical fibers by performing a bi-directional transmission via a single core with a WDM coupler.

Figure 5:
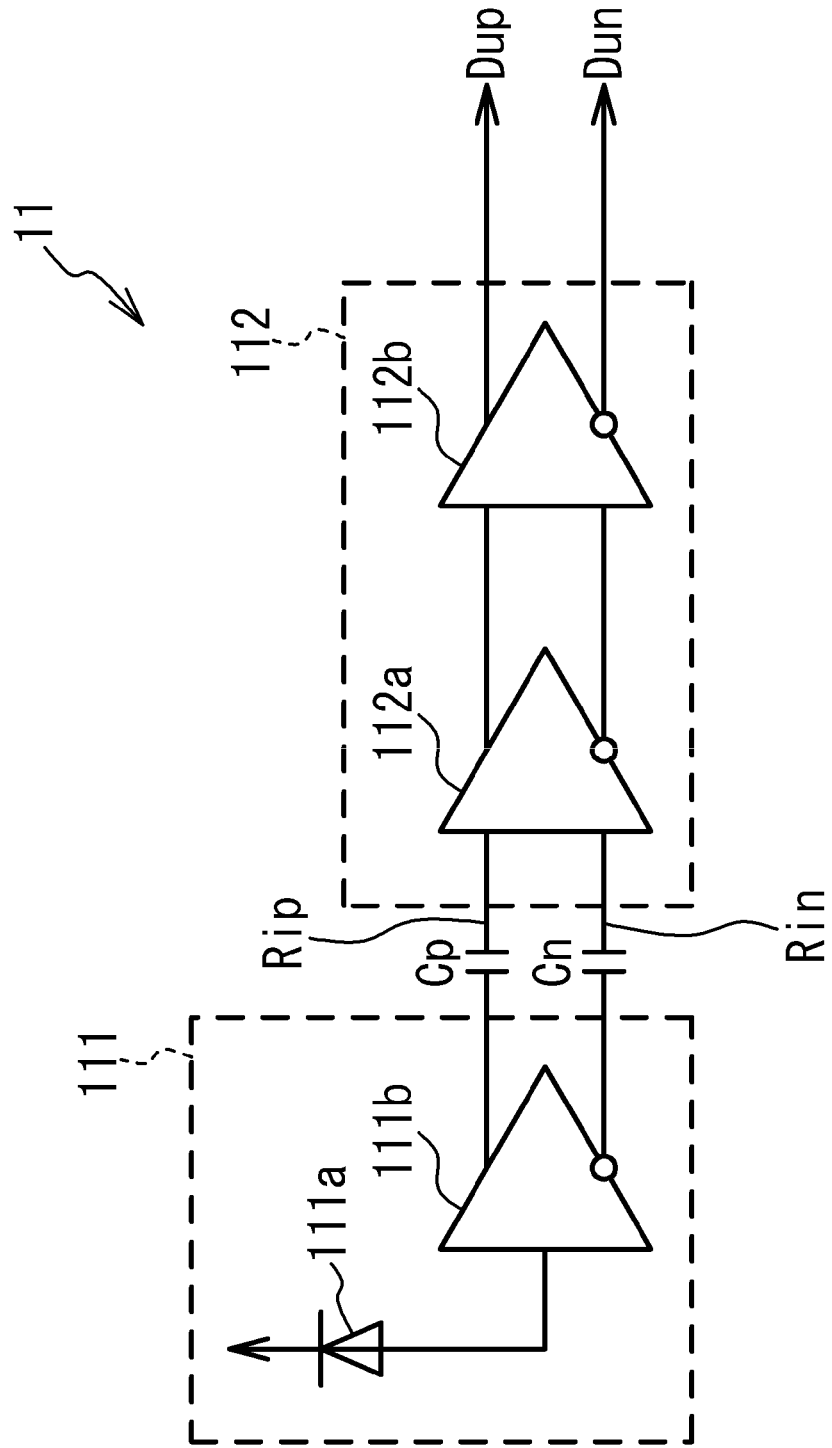
FIG. 5 illustrates a circuit diagram of an optical receiving device of a comparative example.

FIG. 5 illustrates a circuit diagram of the optical receiving device 11 of a comparative example. The optical receiving device 11 has a conversion device 111 and an amplification device 112. The conversion device 111 has a light-receiving element 111a and a preamble amplification device 111b. The conversion device 111 converts an input burst optical signal Su into a positive phase electrical signal Dup and a negative electrical signal Dun.

The light-receiving element 111a is an APD (Avalanche Photo Diode) or the like. The light-receiving element 111a converts the burst optical signal Su into a current signal by a photoelectric conversion and outputs the current signal into the preamble amplification device 111b. The preamble amplification device 111b is a Trans Impedance Amplifier (TIA) or the like. The preamble amplification device 111b converts the current signal input by the light-receiving element 111a into a voltage signal. In concrete, the preamble amplification device 111b generates a positive phase electrical signal Dup and a negative phase electrical signal Dun with use of a differential amplification circuit, and outputs the electrical signals to the amplification device 112 via a pair of output terminals.

The positive phase electrical signal Dup and the negative phase electrical signal Dun are transmitted via transmission lies Rip and Rin respectively. The transmission lines Rip and Rin have coupling capacitors Cp and Cn. That is, the preamble amplification device 111b and the amplification device 112 establish an AC coupling.

The amplification device 112 has the amplification device 112a and an output buffer 112b, and amplifies the positive phase electrical signal Dup and the negative phase electrical signal Dun. The amplification device 112a encodes the positive phase electrical signal Dup and the negative phase electrical signal Dun based on a comparison result between the voltage level and a threshold and outputs the encoded signals to the output buffer 112b. The output buffer 112b is a Limiting Amplifier or the like, converts the positive phase electrical signal Dup and the negative phase electrical signal Dun into voltage signals having a predetermined amplitude with use of a differential amplification circuit, and outputs the voltage signals via a pair of output terminals.

Figure 6:
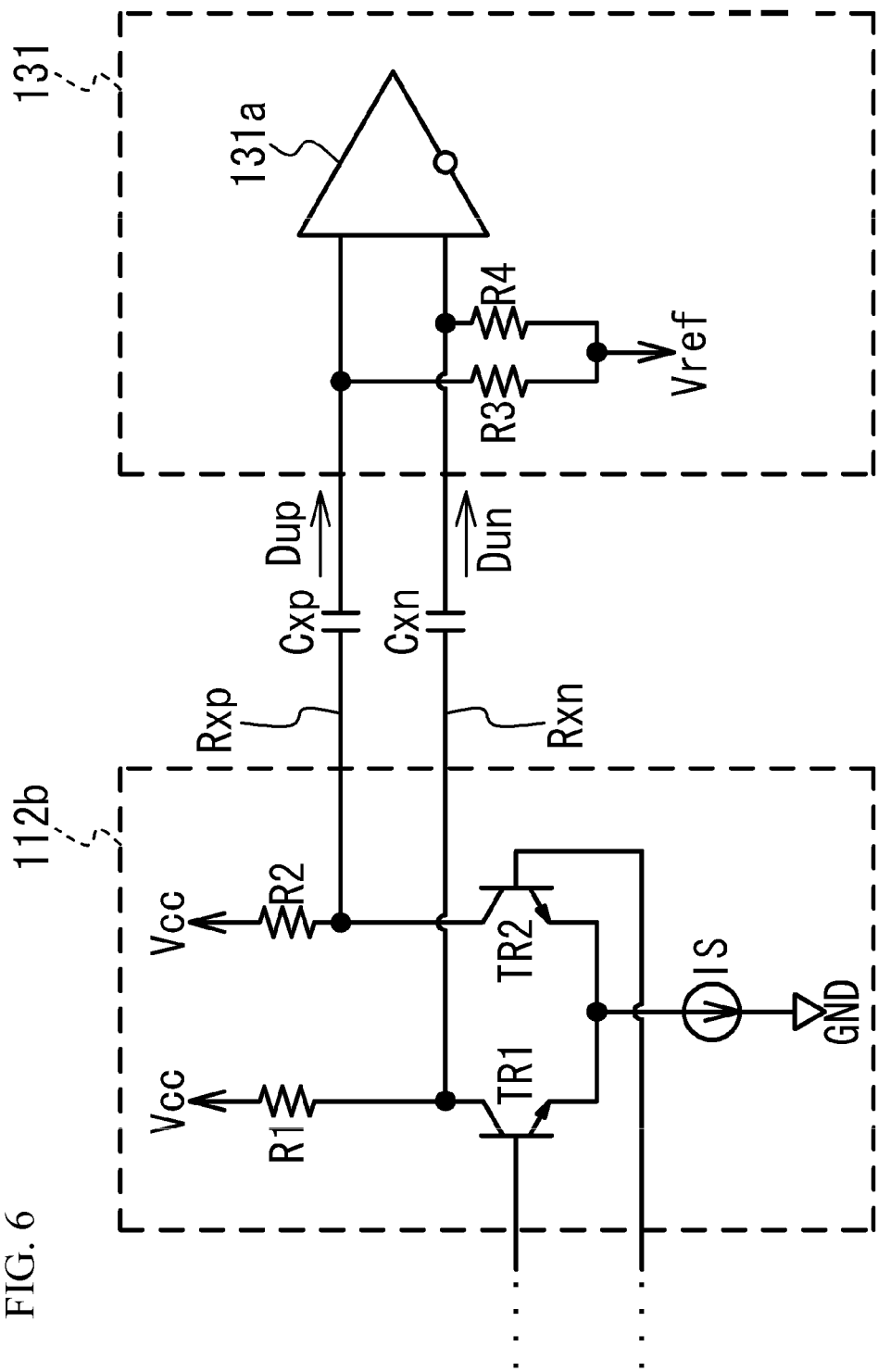
FIG. 6 illustrates a circuit diagram of an AC coupling between an optical receiving device and a re-timing circuit.

FIG. 6 illustrates a circuit diagram of an AC coupling between the optical receiving device 11 and the re-timing circuit 131. In concrete, FIG. 6 illustrates an AC coupling between the output buffer 112b and the re-timing circuit 131. In FIG. 6, only a part of the output buffer 112b and the re-timing circuit 131 is illustrated.

The output buffer 112b has a differential amplification circuit of CML (Common Mode Logic). The differential amplification circuit has resistors R1 and R2, transistors TR1 and TR2, and a constant current source IS.

Collectors of the transistors TR1 and TR2 are coupled to first edges of the resistors R1 and R2 respectively. Second edges of the resistors R1 and R2 are coupled to a power supply Vcc.

Emitters of the transistors TR1 and TR2 are coupled to each other and are coupled to a first edge of a constant current source IS. A second edge of the constant current source IS is coupled to a ground potential GND. The positive phase electrical signal Dup and the negative phase electrical signal Dun are respectively input into bases of the transistors TR1 and TR2. The output buffer 112b converts the positive phase electrical signal Dup and the negative phase electrical signal Dun into voltage signals having a predetermined amplitude and respectively outputs the voltage signals to the transmission lines Rxp and Rxn.

The positive phase electrical signal Dup and the negative phase electrical signal Dun are respectively transmitted via the transmission lines Rxp and Rxn. The transmission lines Rxp and Rxn couple the output buffer 112b to an input buffer 131a in the re-timing circuit 131 via the coupling capacitors Cxp and Cxn respectively. In the re-timing circuit 131, the transmission lines Rxp and Rxn are coupled to a reference potential Vref via resistors R3 and R4 respectively.

Impedance matching is achieved between the output buffer 112b and the input buffer 131a with 50Ω in order to reduce wave distortion of waveforms of the positive phase electrical signal Dup and the negative phase electrical signal Dun. Therefore, an output impedance viewed from the output buffer 112b is 25Ω with respect to an alternate current. Accordingly, when the input buffer 131a is not connected, amplitude of the electrical signals Dup and Dun at an output terminal of the output buffer 112b and an input terminal of the input buffer 131a are a half of the amplitude output by the output buffer 112b itself.

In this manner, the optical receiving device 11 uses an AC couplings with respect to inner transmission lines Rip and Rxn and outer transmission lines Rxp and Rxn. The optical receiving device 11 may use the AC coupling with respect to only one pair of the transmission lines Rip and Rxn and the transmission lines Rxp and Rxn.

When the AC coupling is used, a reference value of a voltage level of the positive phase electrical signal Dup and the negative phase electrical signal Dun fluctuates for a given time because of no-signal period (guard time) between burst optical signals Su, as mentioned above. Therefore, the amplification device 112 and the re-timing circuit 131 are not capable of distinguish a code of the burst optical signals within a given time from a start of receiving of the burst optical signal Su. When the AC coupling is used for a transmission line in which not a burst optical signal Su but a continuous signal such as the downbound signal Sd is transmitted, the phenomenon does not occur. In this case, impedance of the transmission line and a capacitance value of the coupling capacitor are selected so that an adequate low frequency cut-off is achieved.

Figure 7A:
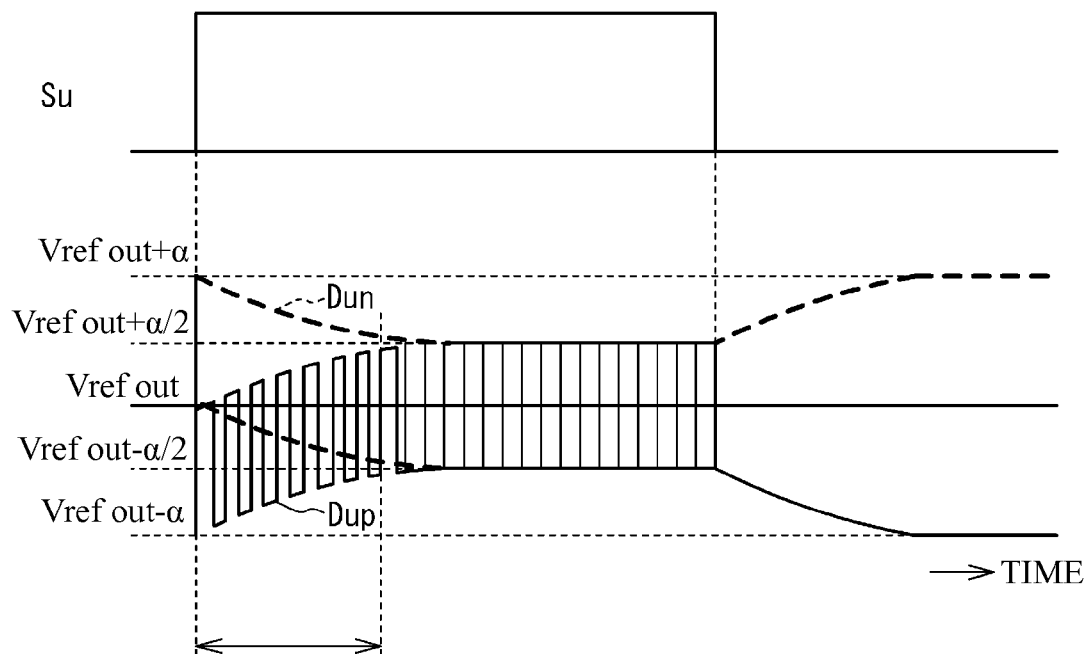
FIG. 7A illustrates a wave diagram of a positive phase electrical signal and a negative phase electrical signal that are output by an output buffer.
Figure 7B:
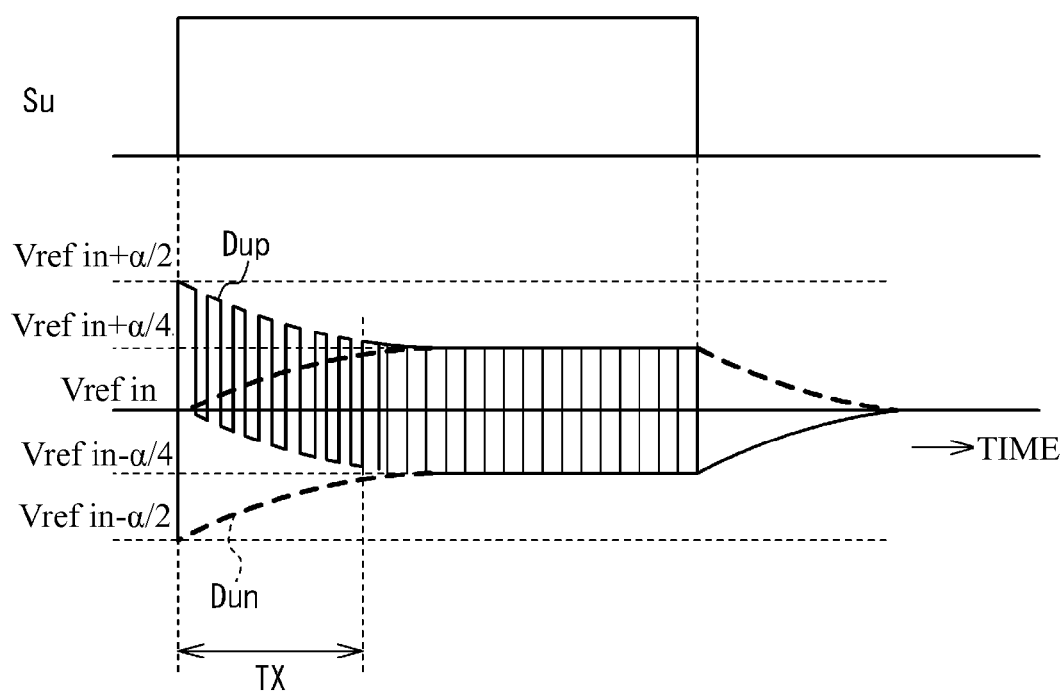
FIG. 7B illustrates a wave diagram of a positive phase electrical signal and a negative phase electrical signal that are input into a re-timing circuit.

FIG. 7A illustrates a waveform diagram of the positive phase electrical signal Dup and the negative phase electrical signal Dun that are output by the output buffer 112b. FIG. 7B illustrates a waveform diagram of the positive phase electrical signal Dup and the negative phase electrical signal Dun that are input into the re-timing circuit 131. In FIG. 7A and FIG. 7B, the burst optical signal Su whose timing is consistent with that of the positive phase electrical signal Dup and the negative phase electrical signal Dun is illustrated. In the example, a description will be given of the AC coupling between the output buffer 112b and the re-timing circuit 131. The AC coupling between the conversion device 111 and the amplification device 112 is similar to the AC coupling between the output buffer 112b and the re-timing circuit 131.

In the no-signal period, a direct current component of the output voltage of the output buffer 112b is cut off from the re-timing circuit 131 because of the cut-off frequency of the coupling capacitors Cxp and Cxn. Therefore, the voltage level is equal to that of a single piece of the output buffer 112b, that is a differential amplifier circuit. That is, the voltage of the transmission line Rxp on the output buffer 112b side is the reference voltage Vrefout−α. The voltage of the transmission line Rxn on the output buffer 112b side is the reference voltage Vrefout+α. The "α" is a value determined by circuit design. On the other hand, input voltage of the re-timing circuit 131, that is, an operation point voltage of the transmission lines Rxp and Rxn between the coupling capacitors Cxp and Cxn and the re-timing circuit 131 is the reference Vrefin.

After that, when the burst optical signal Su is input, the positive phase electrical signal Dup and the negative phase electrical signal Dun are input into the re-timing circuit 131, and Vrefin+α/4 and Vrefin−α/4 shifted from the reference voltage Vrefin are operation point voltages (bias point). That is, the reference voltage of the positive phase electrical signal Dup and the negative phase electrical signal Dun are unbalanced. Therefore, the re-timing circuit 131 is not capable of identifying a code of the positive phase electrical signal Dup and the negative phase electrical signal Dun because a wave distortion and a pulse offset occur.

However, the fluctuation of the operation point voltage of the input signal to the re-timing circuit 131 converges in accordance with a time constant determined by the impedance and the cut-off frequency. Therefore, the positive phase electrical signal Dup and the negative phase electrical signal Dun are input into the re-timing circuit 131 and the operation point voltage is the reference voltage Vrefin, after a predetermined time passes. Thereby, the re-timing circuit 131 is capable of identifying a code of the positive phase electrical signal Dup and the negative phase electrical signal Dun.

In this manner, when the positive phase electrical signal Dup and the negative phase electrical signal Dun are input into the re-timing circuit 131, the positive phase electrical signal Dup and the negative phase electrical signal Dun have a period TX in which it is not possible to identify the code because of the no-signal period (guard time). Therefore, the burst optical signal Su has a preamble section that corresponds to the period TX (with reference to FIG. 2). The preamble section uses a transmission band as mentioned above. Therefore, the preamble section reduces a band efficiency in the upbound direction.

The period TX in which data identification is not possible depends on a time constant based on the impedance of the transmission lines Rxp and Rxn and the capacitance value of the coupling capacitors Cxp and Cxn. Therefore, when the capacitance value of the coupling capacitors Cxp and Cxn is reduced, the period TX can be shortened and the band efficiency can be improved.

However, when the capacitance values of the coupling capacitors Cxp and Cxn are reduced, interference between identical codes continuing in the burst optical signal Su is enhanced. Therefore, the degradation of the receiving sensitivity and error of code identification may occur, and the transmission quality may be degraded. That is, the band efficiency and the transmission quality have a trade-off relation in the upbound direction of the PON. Even if a control method compensating for changing of the reference voltage is adopted, the structure of a circuit detecting the changing of the voltage level of a high-speed signal is complicated and has a high cost. Therefore, the structure it not realistic.

Figure 8:
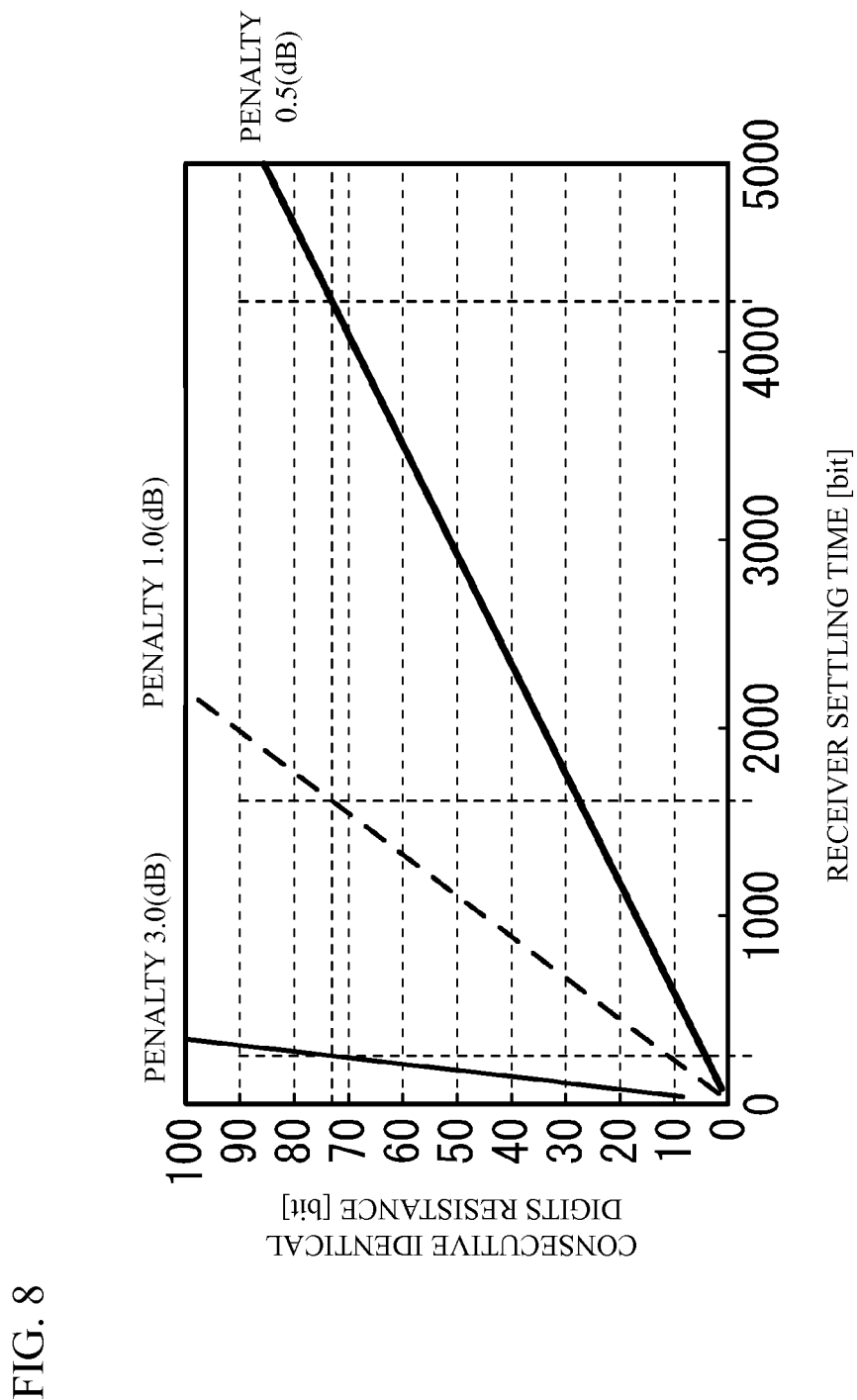
FIG. 8 illustrates a relation of consecutive identical digits resistance with respect to a receiving settling time.

FIG. 8 illustrates a graph of a relation of the consecutive identical digits resistance with respect to the receiver settling time. FIG. 9 illustrates estimated values of the receiver settling time with respect to the spec of the ITU-T recommendation G.987.2. In FIG. 9, a penalty indicates a degradation amount of the receiving sensitivity of the optical receiving device 11 caused by the changing of the operation point voltage according to the consecutive identical digits bit number in a case where identical codes are continuously received. The graph of FIG. 8 is obtained by calculating a changing of the consecutive identical digits resistance with respect to the receiver settling time with respect to each penalty.

As apparent from FIG. 8, the receiver settling time and the penalty have a trade-off relation. The receiver settling time and the consecutive identical digits have a proportional relation. In the spec of the ITU-T G987.2, the consecutive identical digits resistance is 72 (bits). Therefore, a minimum needed receiver settling time is calculated as 4257 (bits) in a case where the penalty is 0.5 dB. The capacitance values of the coupling capacitors Cxp and Cxn in this case is 5.6 nF.

However, in the spec of the ITU-T recommendation G.987.2, a target value of the receiver settling time (maximum value) is 160 bits. The worst value of the receiver settling time is 1856 bits. Therefore, the above-mentioned estimated values do not satisfy any value. The estimated value in a case where the penalty is 1.0 dB is 1577 bits. The estimated value in a case where the penalty is 3.0 dB is 250 bits. Therefore, in these cases, the worst value of the spec of the ITU-T recommendation G.987.2 is satisfied. However, the target value of the spec is not satisfied.

In this manner, the receiver settling time and the consecutive identical digits resistance have a trade-off relation. And so, the optical receiving device 11 of the following embodiments improves the band efficiency effectively by reducing the receiver settling time without lowering the consecutive identical digits resistance.

[First Embodiment]

Figure 10:
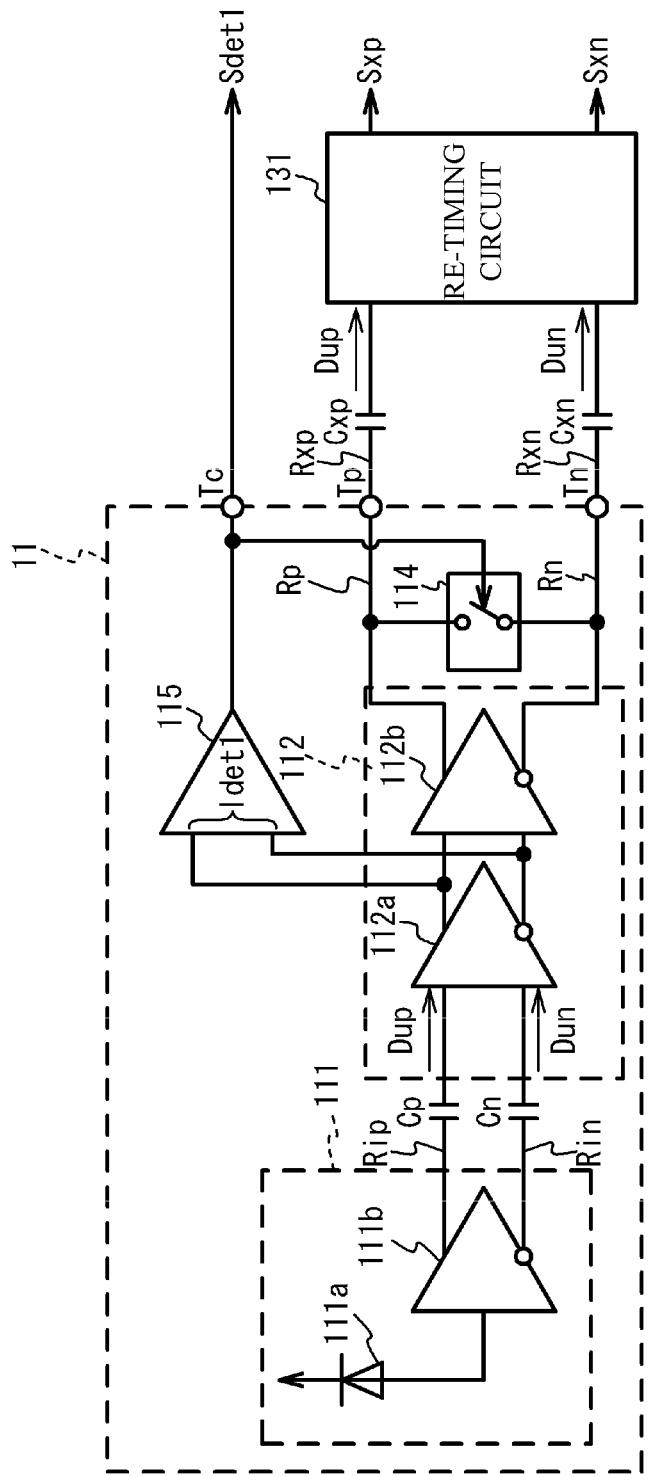
FIG. 10 illustrates a circuit diagram of an optical receiving device in accordance with a first embodiment.

FIG. 10 illustrates a circuit diagram of the optical receiving device 11 in accordance with a first embodiment. In FIG. 10, the same numerals are added to the same components as FIG. 5, and explanations of the same components are omitted. FIG. 10 illustrates the re-timing circuit 131 that is coupled behind the optical receiving device 11, and a positive phase transmission line Rxp and a negative phase transmission line Rxn that couple the optical receiving device 11 with the re-timing circuit 131.

The optical receiving device 11 has the conversion device 111, the amplification device 112, a control device 114, a signal detection device 115, a first transmission line Rp, a second transmission line Rn, a third transmission line Rip, a fourth transmission line Rin, a first output terminal Tp, a second output terminal Tn and a control terminal Tc.

The conversion device 111 has the light-receiving element 111a and the preamble amplification device 111b, and converts an input burst optical signal Su into a positive phase electrical signal Dup and a negative phase electrical signal Dun. The positive phase electrical signal Dup and the negative phase electrical signal Dun are respectively transmitted via a third transmission line Rip and a fourth transmission line Rip between the preamble amplification device 111b and the amplification device 112. The third transmission line Rip has the coupling capacitor Cp. The fourth transmission line Rin has the coupling capacitor Cn.

The amplification device 112 has the amplification device 112a and the output buffer 112b and amplifies the positive phase electrical signal Dup and the negative phase electrical signal Dun. The first output terminal Tp outputs the amplified positive phase electrical signal Dup to the re-timing circuit 131. The second output terminal Tn outputs the amplified negative phase electrical signal Dun to the re-timing circuit 131.

The first transmission line Rp couples the amplification device 112 with the first output terminal Tp. The second transmission line Rn couples the amplification device 112 with the second output terminal Tn. The positive phase electrical signal Dup is transmitted to the first output terminal Tp via the first transmission line Rp. The negative phase electrical signal Dun is transmitted to the second output terminal Tn via the second transmission line Rn.

The positive phase electrical signal Dup is output by the first terminal Tp, and after that, is input into the re-timing circuit 131 via the positive phase transmission line Rxp. The negative phase electrical signal Dun is output by the second output terminal Tn, and after that, is input into the re-timing circuit 131 via the negative phase transmission line Rxn. The transmission line Rxp has the coupling capacitor Cxp. The transmission line Rxn has the coupling capacitor Cxn. The re-timing circuit 131 synchronizes the positive phase electrical signal Dup and the negative phase electrical signal Dun that are amplified by the amplification device 112 with a clock signal in the optical terminal station device 1, and outputs the amplified electrical signals as a positive phase data signal Sxp and a negative phase data signal Sxn respectively.

The signal detection device 115 detects inputting of the burst optical signal Su based on voltage levels of the positive phase electrical signal Dup and the negative phase electrical signal Dun that are output by the amplification device 112a to the output buffer 112b. Peak detection or average detection of the voltages of the electrical signals Dup and Dun or the like are used as the detection method. When the signal detection device 115 detects the inputting of the burst optical signal Su, the signal detection device 115 outputs a detection information signal Sdetl to the control terminal Tc and the control device 114.

The control device 114 reduces a voltage difference between the first transmission line Rp and the second transmission line Rn during a no-signal period between burst optical signals Su. The control device 114 is a switch element. A first end of the control device 114 is coupled with the first transmission line Rp. A second end of the control device 114 is coupled with the second transmission line Rn. On and off of the control device 114 is controlled in accordance with the detection information signal Sdetl. The detection information signal Sdetl output from the control terminal Tc is used for a signal processing of the signal processing device 13.

In concrete, when the mode of the control device 114 is on in the no-signal period, the control device 114 shorts between the first transmission line Rp and the second transmission line Rn. When the mode of the control device 114 is off in the period in which the burst optical signal is being input, the control device 114 opens between the first transmission line Rp and the second transmission line Rn. Thus, in the no-signal period, the potential of the first transmission line Rp is equal to that of the second transmission line Rn. Therefore, the equilibrium of the operation point voltage is maintained between the first transmission line Rp and the second transmission line Rn.

Therefore, even if a direct current component of the output voltage of the output buffer 112b is cutoff from the re-timing circuit 131 by the cutoff frequency of the coupling capacitors Cxp and Cxn, the direct current component does not change and is maintained to be the reference voltage Vref (above-mentioned Vrefout and Vrefin). Therefore, the period TX in which data identification of FIG. 7A and FIG. 7B is not possible is reduced. Therefore, the reduction of the preamble section (receiver settling time with reference to FIG. 2) is possible.

On the other hand, in the inputting period of the burst optical signal Su, each reference voltage of the first transmission line Rp and the second transmission line Rn is maintained to be the predetermined value Vref by the positive phase electrical signal Dup and the negative phase electrical signal Dun. That is, the equilibrium of the operation point voltage (reference voltage) Vref is maintained between the first transmission line Rp and the second transmission line Rn both in the no-signal period and the inputting period of the burst optical signal.

The above-mentioned operation is independent from the capacitance values of the coupling capacitors Cxp and Cxn. Therefore, the optical receiving device 11 is capable of maintaining the consecutive identical digits resistance constant, reducing the receiver settling time, and improving the band efficiency effectively.

[Second Embodiment]

In the first embodiment, the coupling capacitors Cxp and Cxn used for the AC coupling between the optical receiving device 11 and the re-timing circuit 131 are respectively provided on the transmission lines Rxp and Rxn out of the optical receiving device 11. However, the coupling capacitors Cxp and Cxn may be respectively provided on the transmission lines Rip and Rin in the optical receiving device 11.

Figure 11:
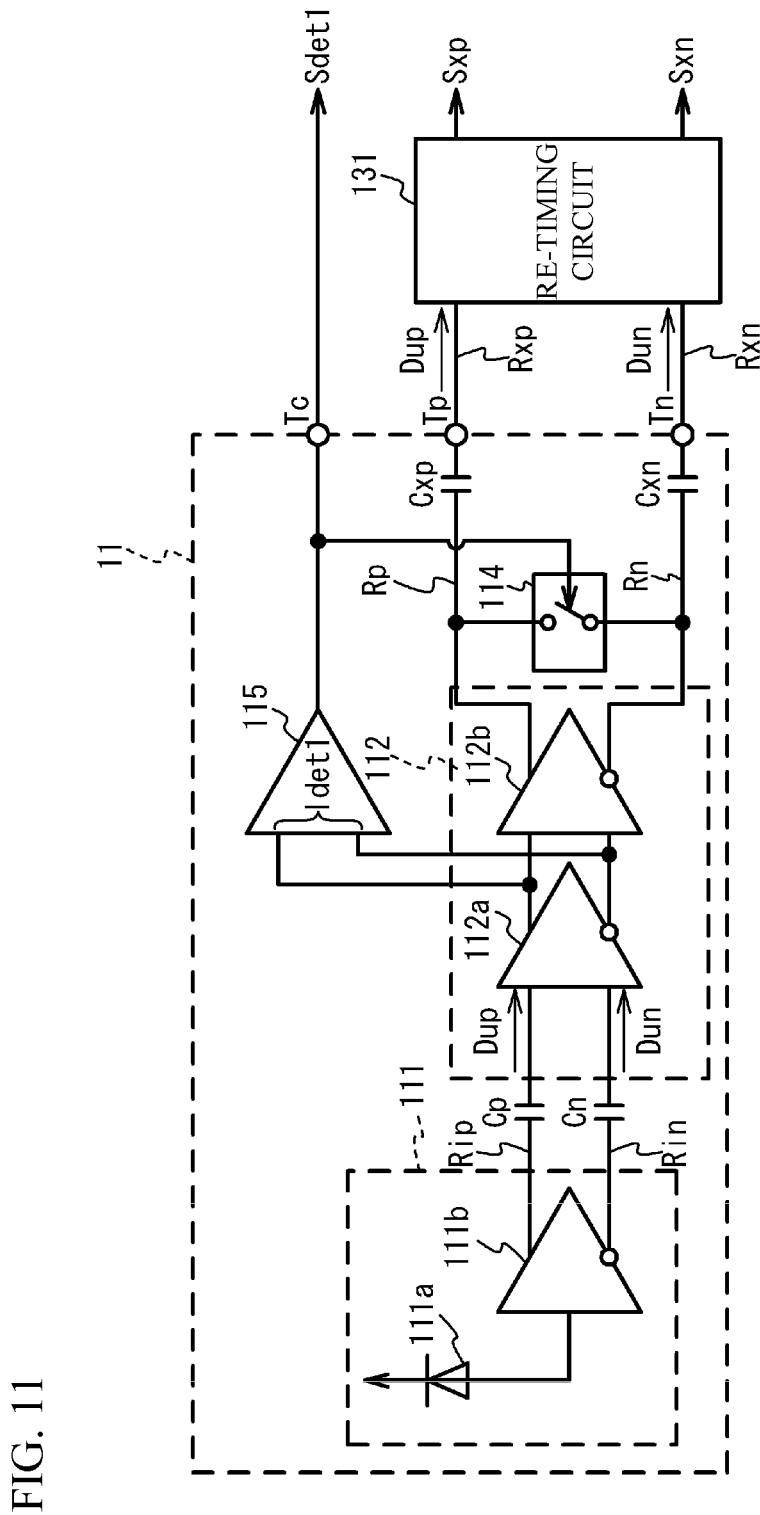
FIG. 11 illustrates a circuit diagram of an optical receiving device in accordance with a second embodiment.

FIG. 11 illustrates a circuit diagram of the optical receiving device 11 in accordance with the second embodiment. In FIG. 11, the same numerals are added to the same components as FIG. 10, and the explanation of the components is omitted.

The optical receiving device 11 has the conversion device 111, the amplification device 112, the control device 114, the signal detection device 115, the first transmission line Rp, the second transmission line Rn, the third transmission line Rip, the fourth transmission line Rin, the first output terminal Tp, the second output terminal Tn and the control terminal Tc.

The optical receiving device 11 is different from the first embodiment in a point that the coupling capacitors Cxp and Cxn used for the AC coupling are respectively provided on the first transmission line Rp and the second transmission line Rn in the optical receiving device 11. That is, the first transmission line Rp and the second transmission line Rn respectively couple the amplification device 112 with the first output terminal Tp and the second output terminal Tn via the coupling capacitors Cxp and Cxn. In this manner, the optical receiving device 11 simplifies the connection with the re-timing circuit 131 by having the coupling capacitors Cxp and Cxn therein.

The control device 114 reduces the potential difference between a portion of the first transmission line Rp between the amplification device 112 and the coupling capacitor Cxp and a portion of the second transmission line Rn between the amplification device 112 and the coupling capacitor Cxn in the no-signal period. In concrete, the control device 114 shorts between the portions of the first transmission line Rp and the second transmission line Rn in the no-signal period, and opens between the portions on the first transmission line Rp and the second transmission line Rn in a period during inputting of the burst optical signal Su.

Therefore, the optical receiving device 11 has the same function and effect as that mentioned above.

Figure 12:
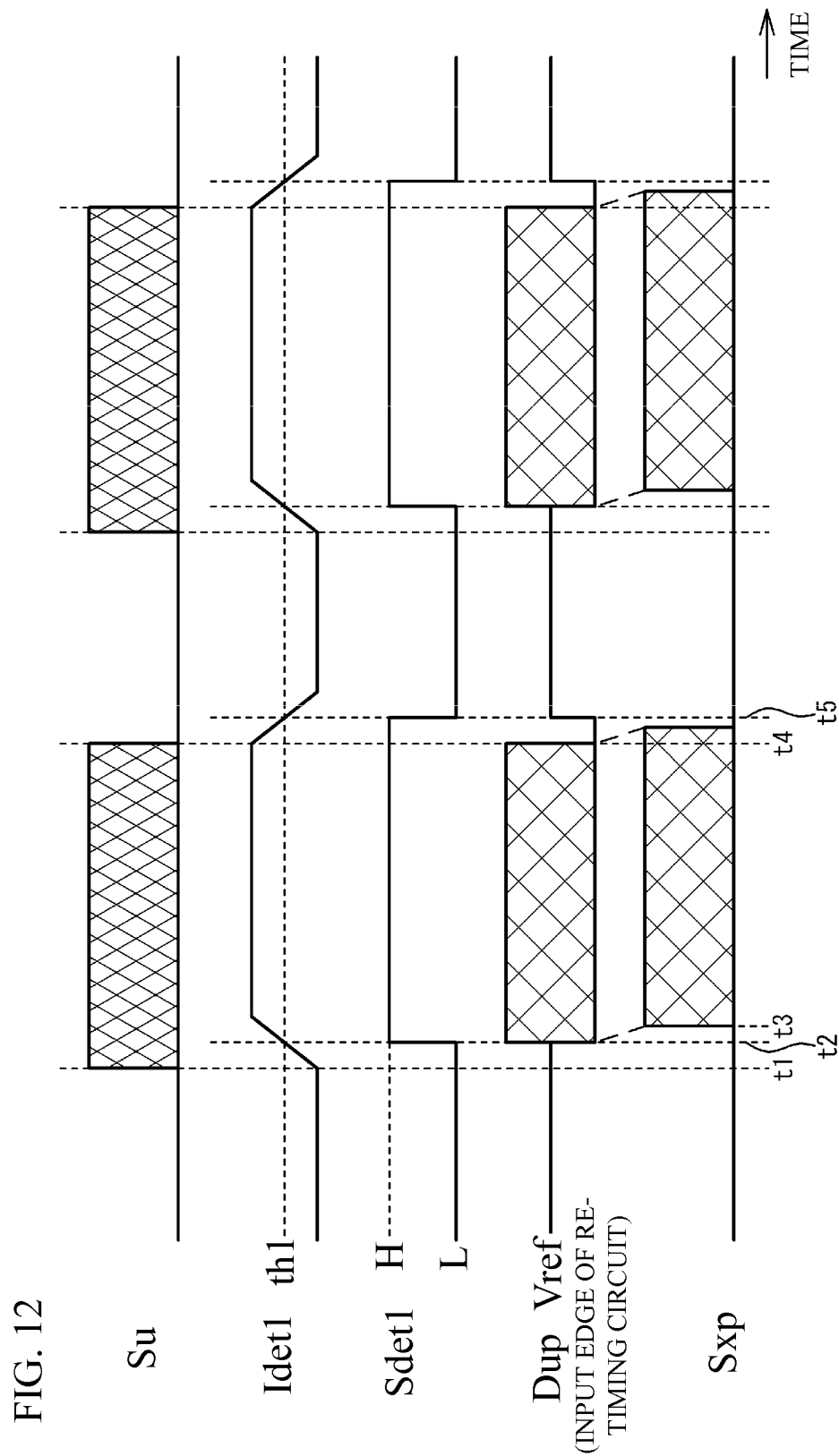
FIG. 12 illustrates a waveform diagram of a signal waveform of a first embodiment and a second embodiment.

FIG. 12 illustrates a waveform diagram of a signal waveform of the first embodiment and the second embodiment. FIG. 12 illustrates waveforms of the burst optical signal Su, the combined signal Idea of the electrical signals Dup and Dun between the amplification device 112a and the output buffer 112b, the detection information signal Sdetl, the electrical signal Dup at the input edge of the re-timing circuit 131, and the data signal Sxp.

When the burst optical signal Su is input at a time t1, a voltage level of the combined signal Idea of the electrical signals Dup and Dun increases, and exceeds a threshold th1 at a time t2. At that time, the signal detection device 115 outputs the detection information signal Sdetl to the control device 114. That is, the voltage level of the detection information signal Sdetl is changed from low ("L") to high ("H").

When the detection information signal Sdetl is input into the control device 114, the phase of the control device 114 is changed from on to off, and thereby the mode between the first transmission line Rp and the second transmission line Rn is changed from short to open. Therefore, the changing of the operation point voltage (reference voltage Vref) is suppressed in the positive phase electrical signal Dup and the negative phase electrical signal Dun. Thus, the period in which code identification is not possible is reduced. At the time t2, the positive phase electrical signal Dup and the negative phase electrical signal Dun are input into the re-timing circuit 131. At the time t3 after that, the data signals Sxp and Sxn that are synchronized are output from the re-timing circuit 131.

When the control device 114 opens between the first transmission line Rp and the second transmission line Rn earlier than the inputting time of the burst optical signal Su by a predetermined time, the operation point voltage (reference voltage Vref) may be changed. In this case, when the capacitance values of the coupling capacitors Cxp and Cxn are adjusted to a larger value, the changing of the operation voltage (reference voltage Vref) can be suppressed. In this case, the low-frequency cutoff of the coupling capacitors Cxp and Cxn is reduced. Therefore, interference between identical codes is suppressed.

When the inputting period of the burst optical signal Su is terminated at the time t4 and the no-signal period (guard time) starts, the voltage level of the combined signal Idea of the electrical signals Dup and Dun is reduced and gets less than a predetermined threshold th1 of the signal detection device 115. In this case, the signal detection device 115 stops the outputting of the detection information signal Sdet1 to the control device 114. That is, the voltage level of the detection information signal Sdet1 is changed from high ("H") to low ("L").

When the inputting of the detection information signal Sdet1 is stopped, the mode of the control device 114 is changed from off to on. And, the mode between the first transmission line Rp and the second transmission line Rn is changed from open to short. Thereby, the potential of the first transmission line Rp is equal to that of the second transmission line Rn. An equilibration of the operation point voltage (reference voltage Vref) is maintained between the first transmission line Rp and the second transmission line Rn.

There is a time difference (delay) between a time t4 when the inputting period of the burst optical signal Su is terminated and the no-signal period starts and a time t5 when the outputting of the detection information signal Sdet1 of the signal detection device 115 is stopped. Therefore, the operation point voltage (reference voltage Vref) may fluctuate. In this case, when the capacitance values of the coupling capacitors Cxp and Cxn are adjusted within a range satisfying a predetermined consecutive identical digits resistance (for example 72 bits), a time constant can be enlarged and the fluctuation of the operation point voltage (reference voltage Vref) can be suppressed.

In the above-mentioned first embodiment and second embodiment, in view of whole of the optical terminal station device 1, the first transmission line Rp and the transmission line Rxp can be considered as a single fifth transmission line, and the second transmission line Rn and the transmission line Rxn can be considered as a single sixth transmission line. In this case, the fifth transmission line and the sixth transmission line couple the amplification device 112 with the signal processing device 13 via the coupling capacitors Cxp and Cxn respectively, and the positive phase electrical signal Dup and the negative phase electrical signal Dun are transmitted.

The control device 114 reduces a potential difference between a portion of the fifth transmission line between the amplification device 112 and the coupling capacitor Cxp and a portion of the sixth transmission line between the amplification device 112 and the coupling capacitor Cxn. This can be applied to structures in which the coupling capacitors Cxp and Cx are provided between the output buffer 112b and the re-timing circuit 131 in the following embodiments.

[Third Embodiment]

In the first embodiment and the second embodiment, the control device 114 distinguishes between the no-signal period and the inputting period of the burst optical signal Su based on the voltage level of the electrical signals Dup and Dun output from the amplification device 112a to the output buffer 112b. However, the structure is not limited. The control device 114 may distinguish between the no-signal period and the inputting period of the burst optical signal Su based on a monitor result of an output current of the light-receiving element 111a.

Figure 13:
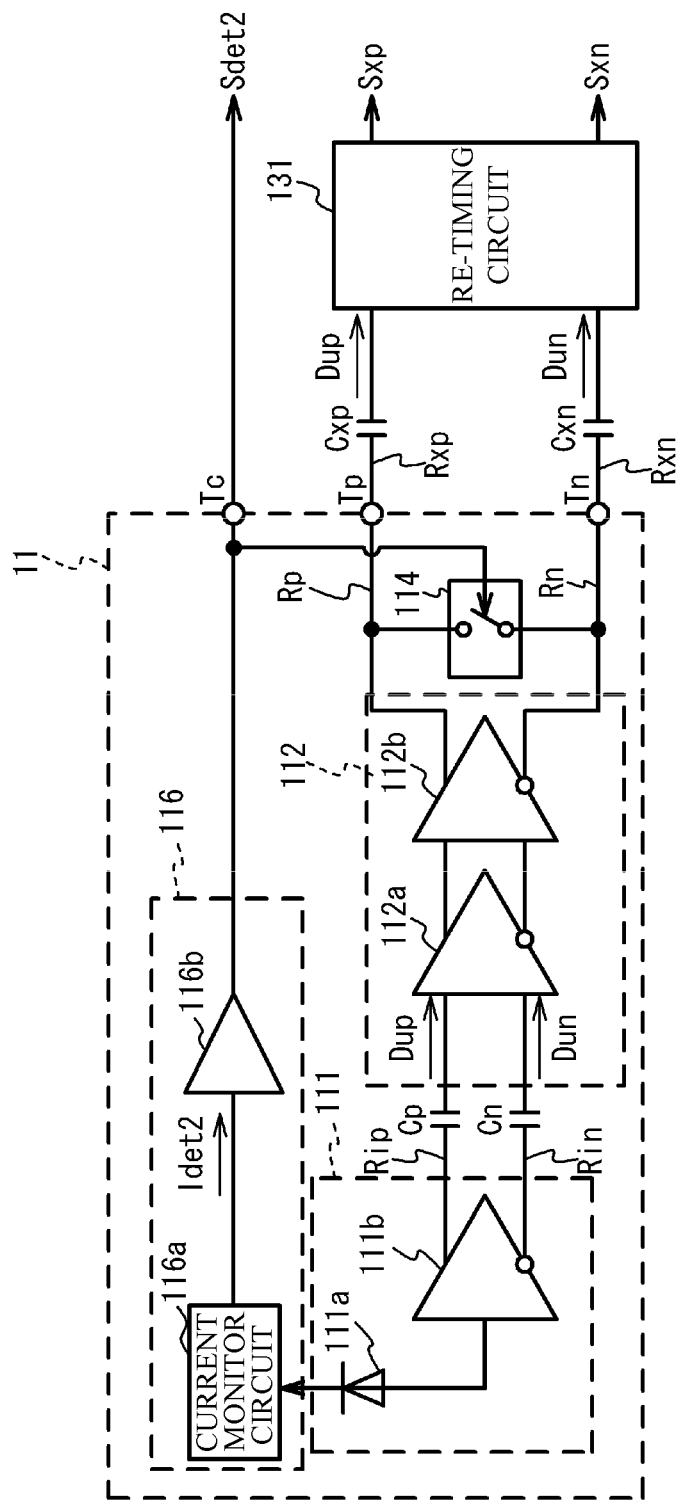
FIG. 13 illustrates a circuit diagram of an optical receiving device in accordance with a third embodiment.

FIG. 13 illustrates a circuit diagram of the optical receiving device 11 in accordance with the third embodiment. The same numerals are added to the same components as FIG. 10, and the explanation of the components is omitted.

The optical receiving device 11 has the conversion device 111, the amplification device 112, the control device 114, the signal detection device 116, the first transmission line Rp, the second transmission line Rn, the third transmission line Rip, the fourth transmission line Rin, the first output terminal Tp, the second output terminal Tn and the control terminal Tc. The positive phase electrical signal Dup and the negative phase electrical signal Dun are respectively output from the first output terminal Tp and the second output terminal Tn, and after that, are input into the re-timing circuit 131 via the positive phase transmission line Rxp and the negative phase transmission line Rxn respectively. The transmission lines Rxp and Rxn respectively the coupling capacitors Cxp and Cxn.

The optical receiving device 11 in accordance with the embodiment is different from the first embodiment and the second embodiment in a point that the signal detection device 116 detects a current of the light-receiving element 111a. The signal detection device (detection device) 116 has a current monitor circuit 116a and a determination device 116b.

The current monitor circuit 116a monitors a current flowing into the light-receiving element 111a, converts the current into a voltage signal Idet2, and outputs the voltage signal Idet2 into the determination device 116b. The current monitor circuit 116a detects an average or a peak of the current flowing into the light-receiving element 111a.

The determination device 116b determines that the inputting period of the burst optical signal Su starts when the voltage level of the voltage signal Idet2 exceeds a threshold th2, and outputs the detection information signal Sdet2 to the control device 114 and the control terminal Tc. On the other hand, the determination device 116b determines that the no-signal period starts when the voltage level of the voltage signal Idet2 is less than the threshold th2, and stops outputting of the detection information signal Sdet2.

The control device 114 opens and shorts between the first transmission line Rp and the second transmission lint Rn based on the detection information signal Sdet2. In concrete, the control device 114 opens between the first transmission line Rp and the second transmission line Rn when the detection information signal Sdet2 is input, and shorts between the first transmission line Rp and the second transmission line Rn when the inputting of the detection information signal Sdet2 is stopped.

The optical receiving device 11 can have the same function and effect as the above-mentioned embodiments. In the embodiment, the control device 114 opens and shorts between the first transmission line Rp and the second transmission line Rn based on the current of the light-receiving element 111a provided in front of the amplification device 112. Therefore, the control timing is improved more than the first embodiment and the second embodiment.

[Fourth Embodiment]

In the third embodiment, the coupling capacitors Cxp and Cxn used for the AC coupling between the optical receiving device 11 and the re-timing circuit 131 are provided on the transmission lines Rxp and Rxn out of the optical receiving device 11. However, the coupling capacitors Cxp and Cxn may be provided on the transmission lines Rip and Rin in the optical receiving device 11.

Figure 14:
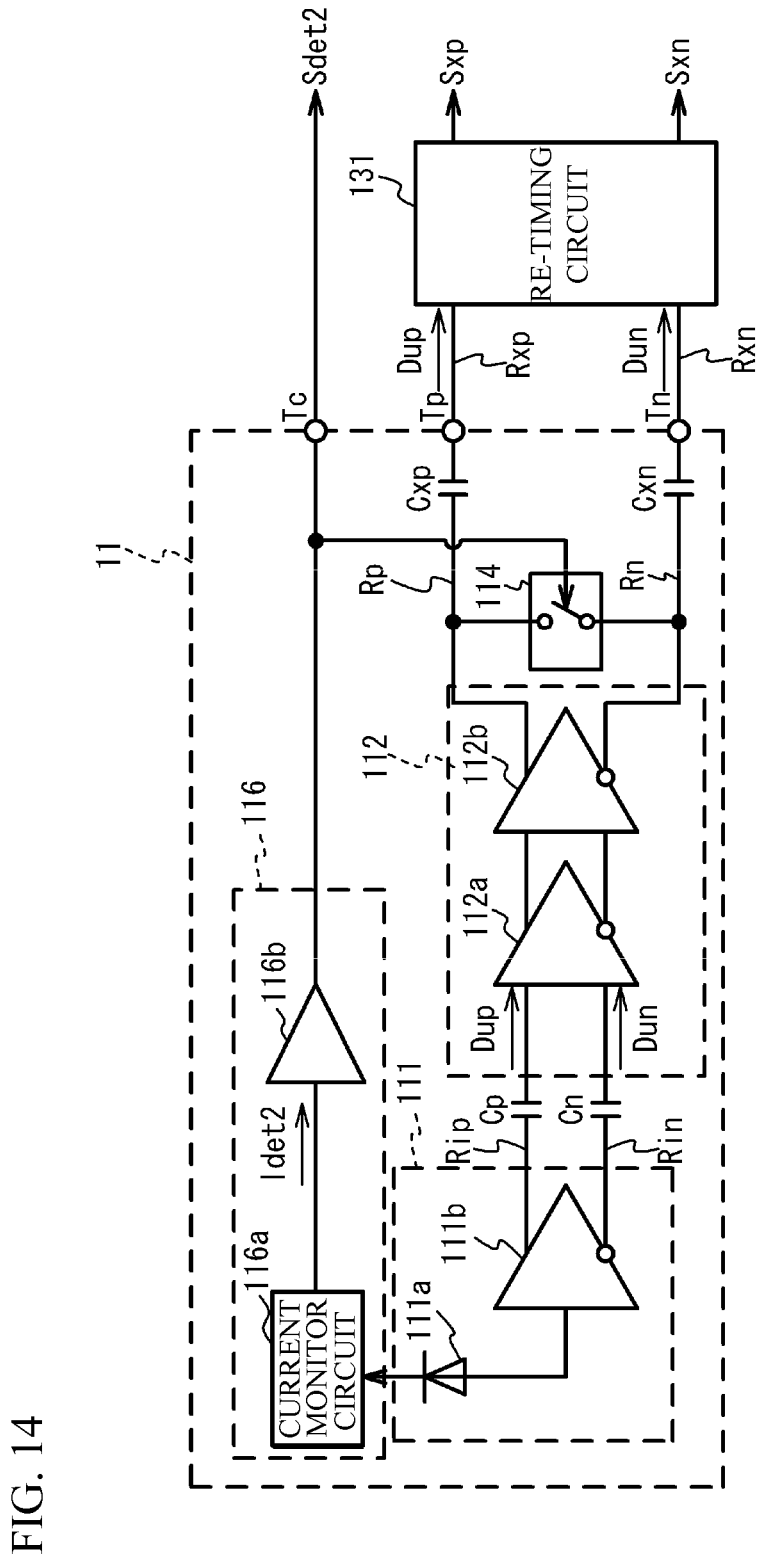
FIG. 14 illustrates a circuit diagram of an optical receiving device in accordance with a fourth embodiment.

FIG. 14 illustrates a circuit diagram of the optical receiving device 11 in accordance with a fourth embodiment. In FIG. 14, the same numerals are added to the same components as FIG. 13, and the explanation of the components is omitted.

The optical receiving device 11 has the conversion device 111, the amplification device 112, the control device 114, the signal detection device 116, the first transmission line Rp, the second transmission line Rn, the third transmission line Rip, the fourth transmission line Rin, the first output terminal Tp, the second output terminal Tn and the control terminal Tc.

The optical receiving device 11 is different from the third embodiment in a point that the coupling capacitors Cxp and Cxn used for the AC coupling are provided on the first transmission line Rp and the second transmission line Rn in the optical receiving device 11. That is, the first transmission line Rp and the second transmission line Rn couple the amplification device 112 with the first output terminal Tp and the second output terminal Tn respectively via the coupling capacitors Cxp and Cxn. In this manner, the optical receiving device 11 is capable of simplifying the connection with the re-timing circuit 131 by having the coupling capacitors Cxp and Cxn therein.

The control device 114 reduces a potential difference between a portion of the first transmission line Rp extending toward between the amplification device 112 and the coupling capacitor Cxp and a portion of the second transmission line Rn extending toward between the amplification device 112 and the coupling capacitor Cxn. In concrete, the control device 114 shorts between the portions of the first transmission line Rp and the second transmission line Rn in the no-signal period, and opens the portions of the first transmission line Rp and the second transmission line Rn during the inputting period of the burst optical signal Su.

Therefore, the optical receiving device 11 can have the operation and effect as the above-mentioned embodiments.

Figure 15:
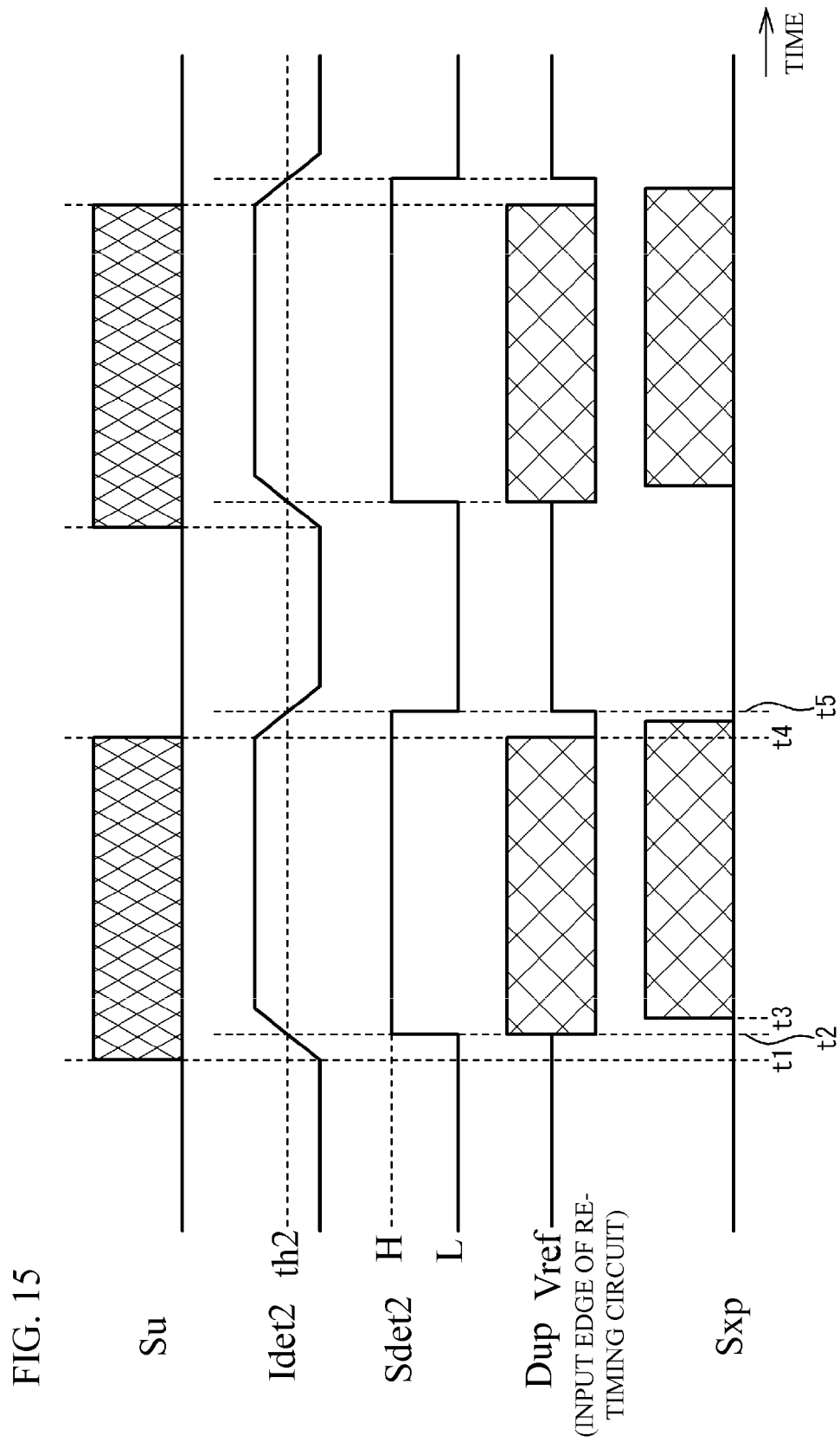
FIG. 15 illustrates a waveform diagram of a signal waveform of a third embodiment and a fourth embodiment.

FIG. 15 illustrates a waveform diagram of the third embodiment and the fourth embodiment. FIG. 15 illustrates the waveforms of the burst optical signal Su, the voltage signal Idet2, the detection information signal Sdet2, the electrical signal Dup at the input edge of the re-timing circuit 131, and the data signal Sxp.

When the burst optical signal Su is input at the time t1, the current output from the light-receiving element 111a increases. Therefore, the voltage level of the voltage signal Idet2 increases, and exceeds the threshold th2 at the time t2. In this case, the determination device 116b outputs a detection information signal Sdet2 to the control device 114. That is, the voltage level of the detection information signal Sdet2 is changed from low ("L") to high ("H").

When the detection information signal Sdet2 is input into the control device 114, the mode of the control device 114 is changed from on to off, and the mode between the first transmission line Rp and the second transmission line Rn is changed from short to open. Therefore, the fluctuation of the operation point voltage (reference voltage Vref) of the positive phase electrical signal Dup and the negative phase electrical signal Dun is suppressed, and the period TX in which code identification is not possible is reduced. The positive phase electrical signal Dup and the negative phase electrical signal Dun are input into the re-timing circuit 131 at the time t2. After that, the synchronized data signals Sxp and Sxn are output from the re-timing circuit 131 at the time t3.

When the control device 114 opens between the first transmission line Rp and the second transmission line Rn earlier than the inputting time t1 of the burst optical signal Su by more than a predetermined time, the fluctuation of the operation point voltage (reference voltage Vref) may occur. In this case, when the capacitance values of the coupling capacitors Cxp and Cxn are enlarged, the fluctuation of the operation point voltage (reference voltage Vref) can be suppressed. In this case, the low frequency cut-off of the coupling capacitors Cxp and Cxn decreases. Therefore, interference between identical codes is suppressed.

When the inputting period of the burst optical signal Su is terminated and the no-signal period (guard time) starts at the time t4, the current output from the light-receiving element 111a is reduced. Therefore, the voltage level of the voltage signal Idet2 decreases, and gets less than the threshold th2 at the time t5. In this case, the determination device 116b stops outputting of the detection information signal Sdet2 to the control device 114. That is, the voltage level of the detection information signal Sdet2 is changed from high ("H") to low ("L").

When the inputting of the detection information signal Sdet2 is stopped, the mode of the control device 114 is changed from off to on, and the mode between the first transmission line Rp and the second transmission line Rn is changed from open to short. Thus, the potential of the first transmission line Rp is equal to that of the second transmission line Rn. The equilibrium of the operation point voltage (reference voltage Vref) is maintained between the first transmission line Rp and the second transmission line Rn.

There is a time difference (delay) between the time t4 at which the inputting period of the burst optical signal Su is terminated and the no-signal period starts and the time t5 at which outputting of the detection information signal Sdet2 of the signal detection device 115 is stopped. Therefore, the fluctuation of the operation point voltage (reference voltage Vref) may occur. In this case, when the capacitance values of the coupling capacitors Cxp and Cxn are adjusted within a range satisfying a given consecutive identical digits resistance (for example 72 bits), the time constant is enlarged and the fluctuation of the operation point voltage (reference voltage Vref) can be suppressed.

[Fifth Embodiment]

In the first embodiment to the fourth embodiment, the third transmission line Rip and the fourth transmission line Rin between the conversion device 111 and the amplification device 112 are AC-coupled via the coupling capacitors Cp and Cn. However, each potential of the third transmission line Rip and the fourth transmission line Rin is not controlled. And so, when each potential of the third transmission line Rip and the fourth transmission line Rin between the conversion device 111 and the amplification device 112 is controlled as in the case of the control device 114, the fluctuation of the operation point voltage (reference voltage Vref) of the third transmission line Rip and the fourth transmission line Rin may be suppressed.

Figure 16:
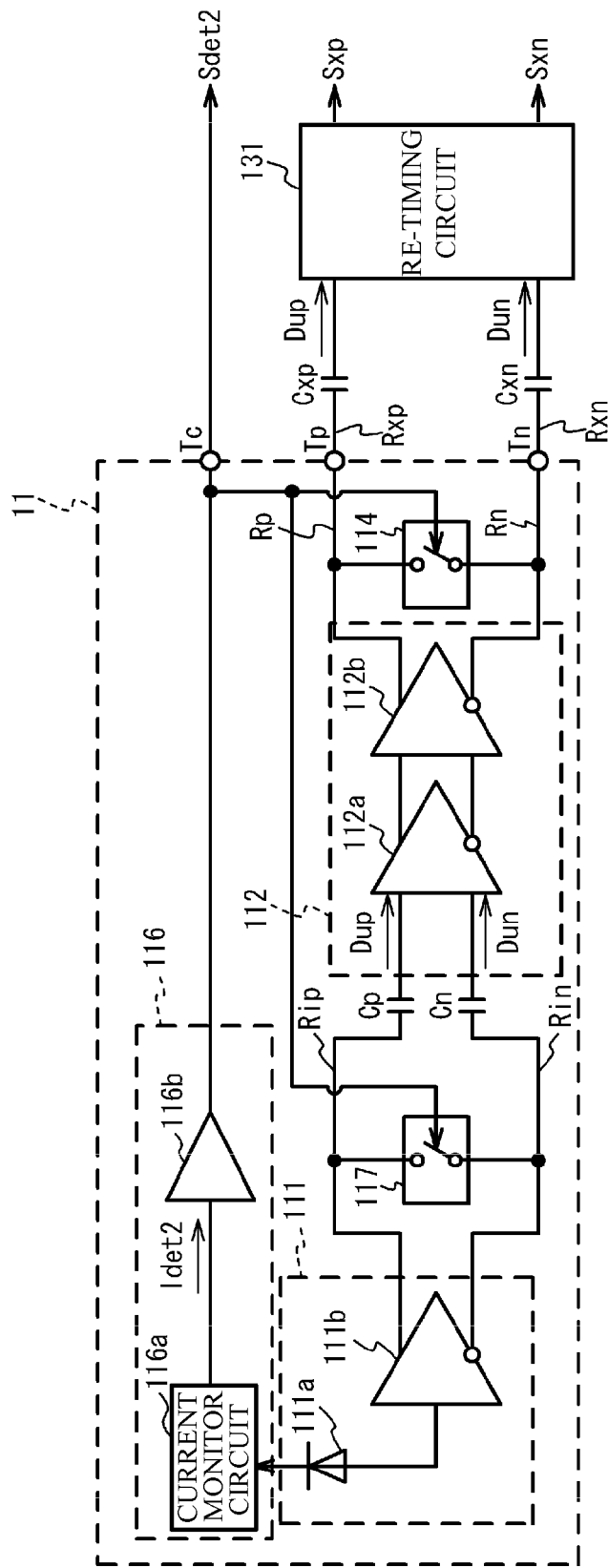
FIG. 16 illustrates a circuit diagram of an optical receiving device in accordance with a fifth embodiment.

FIG. 16 illustrates a circuit diagram of the optical receiving device 11 in accordance with a fifth embodiment. In FIG. 16, the same numerals are added to the same components as FIG. 13, and the explanation of the components is omitted.

The optical receiving device 11 has the conversion device 111, the amplification device 112, the control device 114, the signal detection device 116, the first transmission line Rp, the second transmission line Rn, the third transmission line Rip, the fourth transmission line Rin, the first output terminal Tp, the second output terminal Tn and the control terminal Tc. The positive phase electrical signal Dup is output from the first output terminal Tp, and after that, is input into the re-timing circuit 131 via the positive phase transmission line Rxp. The negative phase electrical signal Dun is output from the second output terminal Tn, and after that, is input into the re-timing circuit 131 via the negative phase transmission line Rxn. The transmission lines Rxp and Rxn respectively have the coupling capacitors Cxp and Cxn. The third transmission line Rip couples the conversion device 111 with the amplification device 112 via the coupling capacitor Cp. The fourth transmission line Rin couples the conversion device 111 with the amplification device 112 via the coupling capacitor Cn.

The optical receiving device 11 is different from the first to fourth embodiments in a point that the optical receiving device 11 has an input-side control device 117 (control device) that reduces a potential difference between the third transmission line Rip and the fourth transmission line Rin. In concrete, the input-side control device 117 reduces a potential difference between a portion of the third transmission line Rip between the conversion device 111 and the coupling capacitor Cp and a portion of the fourth transmission line Rin between the conversion device 111 and the coupling capacitor Cn.

The input-side control device 117 is a switch element. A first edge of the input-side control device 117 is coupled with the third transmission line Rip, a second edge is coupled with the fourth transmission line Rin. The on-off mode of the input-side control device 117 is controlled in accordance with the detection information signal Sdet1. The detection information signal Sdet1 output from the control terminal Tc is used for the signal processing of the signal processing device 13.

The signal detection device 116 outputs the detection information signal Sdet2 to the control device 114, the input-side control device 117 and the control terminal Tc. The input-side control device 117 is a switch element. A first edge of the input-side control device 117 is coupled with the third transmission line Rip, and a second edge of the input-side control device 117 is coupled with the fourth transmission line Rin. Similar to the control device 114, the mode between the third transmission line Rip and the fourth transmission line Rin is changed between open and short in accordance with the detection information signal Sdet2. In concrete, the input-side control device 117 opens between the third transmission line Rip and the fourth transmission line Rin when the detection information signal Sdet2 is input. The input-side control device 117 shorts between the third transmission line Rip and the fourth transmission line Rin when the inputting of the detection information signal Sder2 is being stopped.

Therefore, the optical receiving device 11 maintains not only the equilibrium of the operation point voltage (reference voltage Vref) between the first transmission line Rp and the second transmission line Rn but also the equilibrium of the operation point voltage (reference voltage Vref0) between the third transmission line Rip and the fourth transmission line Rin.

[Sixth Embodiment]

In the fifth embodiment, the coupling capacitors Cxp and Cxn used for the AC coupling between the optical receiving device 11 and the re-timing circuit 131 are respectively provided on the transmission lines Rxp and Rxn out of the optical receiving device 11. However, the coupling capacitors Cxp and Cxn may be respectively provided on the transmission lines Rip and Rin in the optical receiving device 11.

Figure 17:
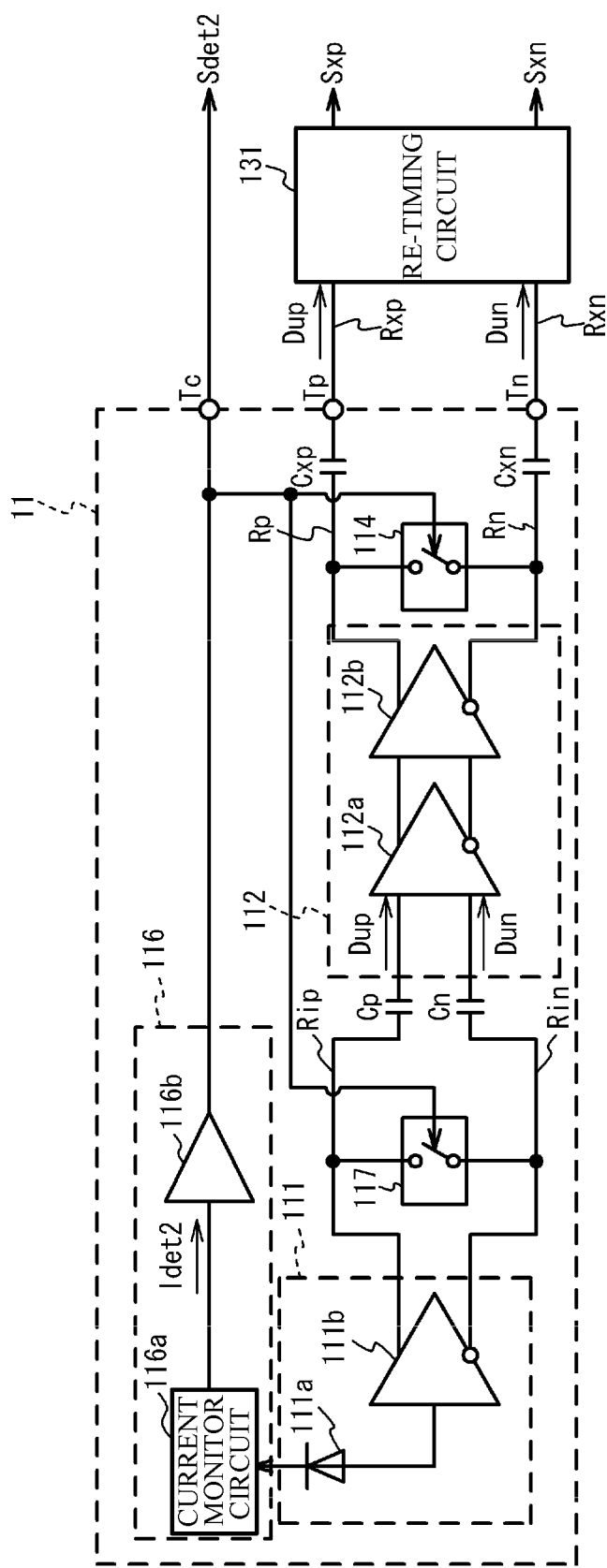
FIG. 17 illustrates a circuit diagram of an optical receiving device in accordance with a sixth embodiment.

FIG. 17 illustrates a circuit diagram of the optical receiving device 11 in accordance with a sixth embodiment. In FIG. 17, the same numerals are added to the same components as FIG. 16, and the explanation of the components is omitted.

The optical receiving device 11 has the conversion device 111, the amplification device 112, the control device 114, the input-side control device 117, the signal detection device 116, the first transmission line Rp, the second transmission line Rn, the third transmission line Rip and the fourth transmission line Rin. The optical receiving device 11 has the first output terminal Tp the second output terminal Tn and the control terminal Tc.

The optical receiving device 11 is different from the fifth embodiment in a point that the first transmission line Rp and the second transmission line Rn in the optical receiving device 11 respectively have the coupling capacitors Cxp and Cxn used for the AC coupling. That is, the first transmission line Rp and the second transmission line Rn respectively couple the amplification device 112 with the first output terminal Tp and the second output terminal Tn via the coupling capacitors Cxp and Cxn. In this manner, the optical receiving device 11 of the embodiment is capable of simplifying the connection with the re-timing circuit 131 by having the coupling capacitors Cxp and Cxn therein.

The control device 114 reduces a potential difference between a portion of the first transmission line Rp between the amplification device 112 and the coupling capacitor Cxp and a portion of the second transmission line Rn between the amplification device 112 and the coupling capacitor Cxn in the no-signal period. In concrete, the control device 114 shorts between the portions of the first transmission line Rp and the second transmission line Rn in the no-signal period, and opens between the portions of the first transmission line Rp and the second transmission line Rn in the period in which the burst optical signal is being input.

The input-side control device 117 reduces a potential difference between a portion of the third transmission line Rip between the preamble amplification device 111b and the coupling capacitor Cp and a portion of the fourth transmission line Rin between the preamble amplification device 111b and the coupling capacitor Cn. In concrete, the input-side control device 117 shorts between the portions of the third transmission line Rip and the fourth transmission line Rin during the no-signal period and opens between the portions of the third transmission line Rip and the fourth transmission line Rin during the period in which the burst optical signal Su is being input.

Therefore, the optical receiving device 11 of the embodiment is capable of achieving the function and the effect as above-mentioned embodiments.

Figure 18:
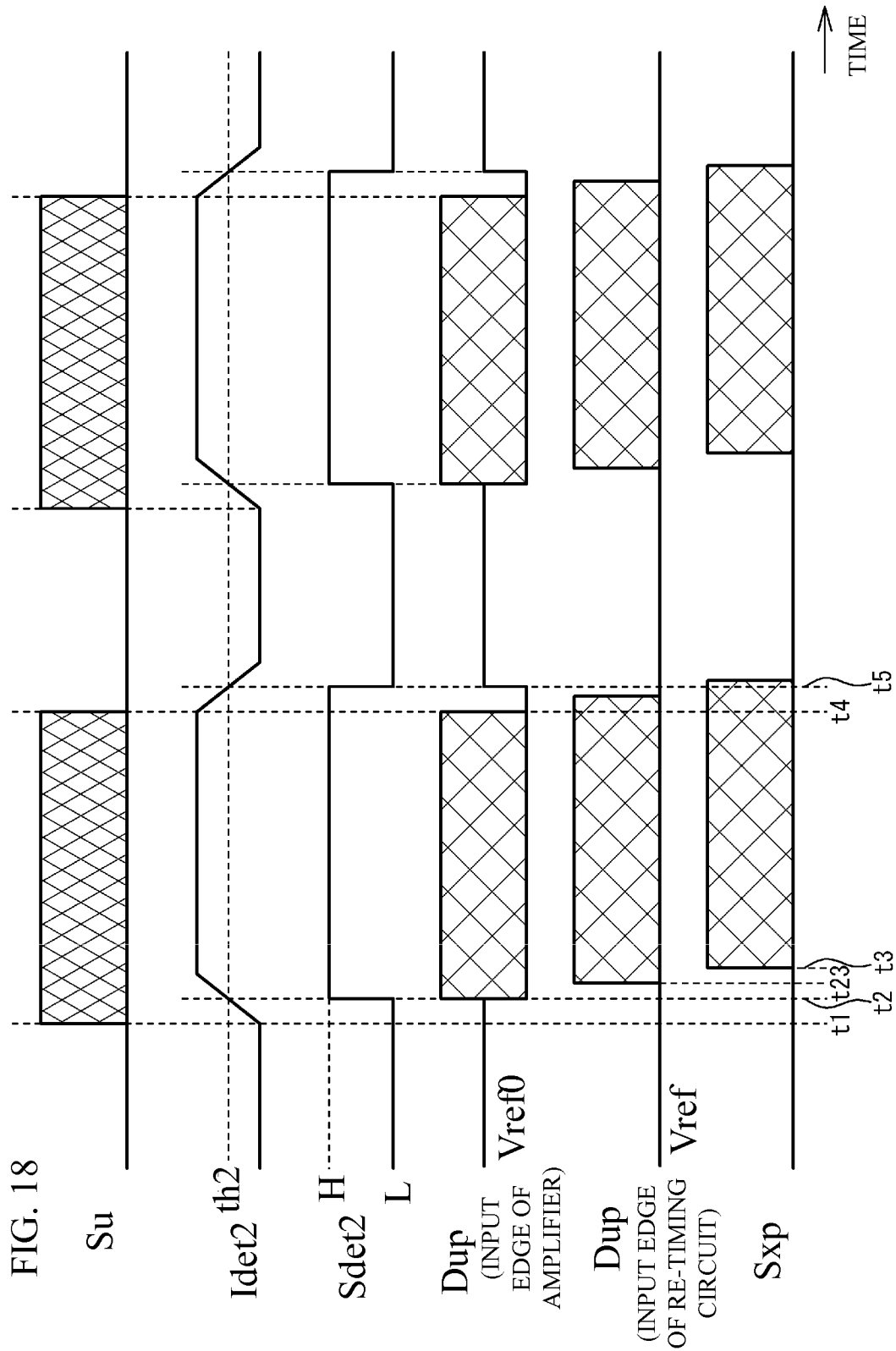
FIG. 18 illustrates a waveform diagram of a signal waveform of a fifth embodiment and a sixth embodiment.

FIG. 18 illustrates a waveform diagram of a signal waveform of the fifth embodiment and the sixth embodiment. In FIG. 18, waveforms of the burst optical signal Su, the voltage signal Idet2 and the detection information signal Sder2 are illustrated. In FIG. 18, the waveforms of the electrical signal Dup at the input edge of the amplification device 112a, the electrical signal Dup at the input edge of the re-timing circuit 131 and the data signal Sxp are illustrated.

When the burst optical signal Su is input at the time tl, the current output from the light-receiving element 111 a increases. Therefore, the voltage level of the voltage signal Idet2 increases, and exceeds the threshold th2 at the time t2. In this case, the determination device 116b outputs the detection information signal Sder2 to the control device 114 and the input-side control device 117. That is, the voltage level of the detection information signal Sdet2 is changed from low ("L") to ("H").

When the detection information signal Sdet2 is input, the mode of the input-side control device 117 is changed from on to off, and the mode between the third transmission line Rip and the fourth transmission line Rin is changed from short to open. When the detection information signal Sder2 is input, the mode of the control device 114 is changed from on to off, and the mode between the first transmission line Rp and the second transmission line Rn is changed from short to open.

Therefore, the fluctuation of the operation point voltage (reference voltage Vref) of the positive phase electrical signal Dup and the negative phase electrical signal Dun is suppressed in the first transmission line Rp, the second transmission line Rn, the third transmission line Rip and the fourth transmission line Rin. And the period TX in which the code identification is not possible is reduced. At the time t2, the positive phase electrical signal Dup and the negative phase electrical signal Dun are input into the amplification device 112a. After that, at the time t23, the positive phase electrical signal Dup and the negative phase electrical signal Dun are input into the re-timing circuit 131. At the time t3, the synchronized data signals Sxp and Sxn are output from the re-timing circuit 131.

When the inputting period of the burst optical signal Su is terminated and the no-signal period (guard time) starts at the time t4, the current output from the light-receiving element 111a is reduced. Therefore, the voltage level of the voltage signal Idet2 decreases and gets less than the threshold th2 at the time t5. In this case, the determination device 116b stops outputting of the detection information signal Sdet2 to the control device 114 and the input-side control device 117. That is, the voltage level of the detection information signal Sdet2 is changed from high ("H") to low ("L").

When the inputting of the detection information signal Sdet2 is stopped, the mode of the input-side control device 117 is changed from off to on, and the mode between the third transmission line Rip and the fourth transmission line Rin is changed from open to short. Thus, the potential of the third transmission line Rip is equal to that of the fourth transmission line Rin. And, the equilibrium of the operation point voltage (reference voltage Vref) is maintained between the third transmission line Rip and the fourth transmission line Rin.

When the inputting of the detection information signal Sdet2 is stopped, the mode of the control device 114 is changed from off to on, and the mode between the first transmission line Rp and the second transmission line Rn is changed from open to short. Thus, the potential of the first transmission line Rp is equal to that of the second transmission line Rn. And, the equilibrium of the operation point voltage (reference voltage Vref) is maintained between the first transmission line Rp and the second transmission line Rn.

[Seventh Embodiment]

In the first to sixth embodiments, the control device 114 and the input-side control device 117 reduce the potential difference between the first transmission line Rp and the second transmission line Rn and between the third transmission line Rip and the fourth transmission line Rip based on the detection information signals Sdet1 and Sdet2 of the signal detection devices 115 and 116. However, the control device 114 and the input-side control device 117 may perform the control of the potential difference based on a control signal input from outside instead of the detection information signals Sdet1 and Sdet2.

Figure 19:
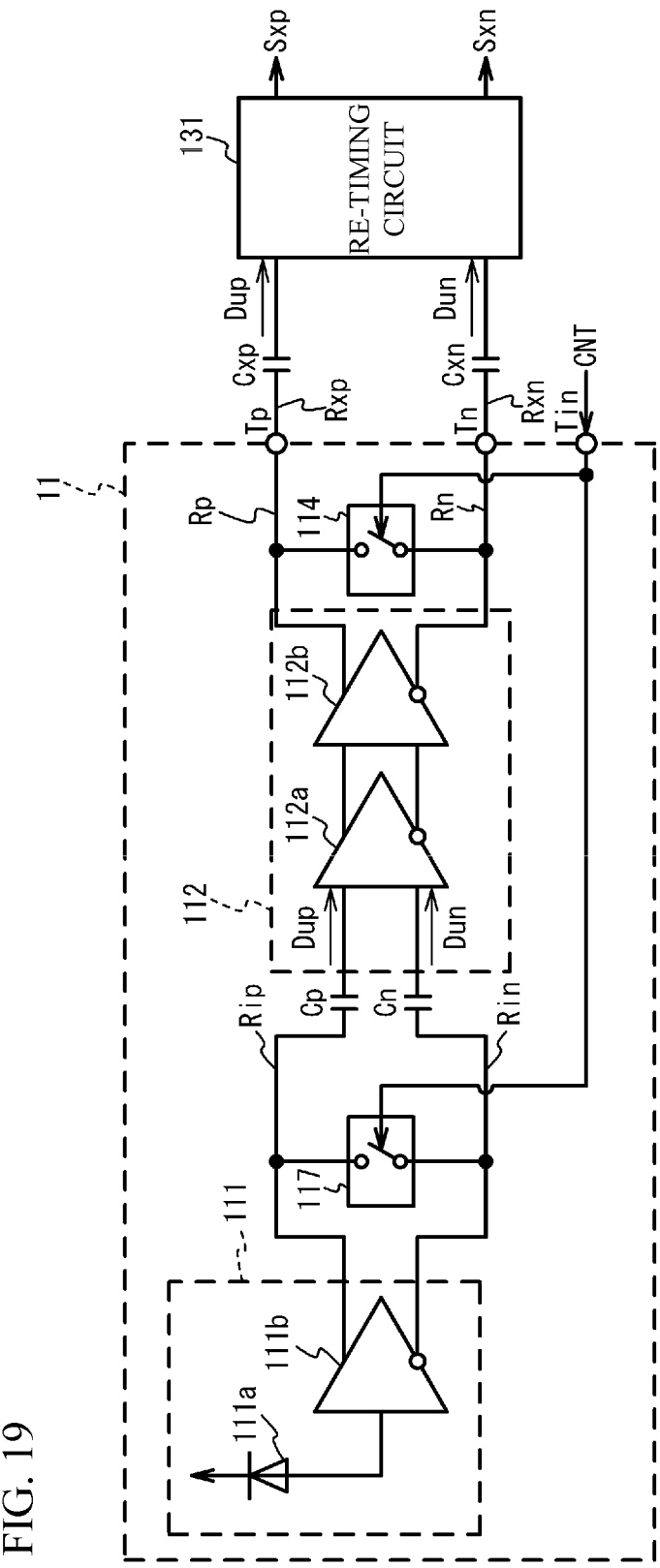
FIG. 19 illustrates a circuit diagram of an optical receiving device in accordance with a seventh embodiment.

FIG. 19 illustrates a circuit diagram of the optical receiving device 11 in accordance with a seventh embodiment. The same numerals are added to the same components as FIG. 16, and the explanation of the components is omitted.

The optical receiving device 11 has the conversion device 111, the amplification device 112, the control device 114, the input-side control device 117, the first transmission line Rp, the second transmission line Rn, the third transmission line Rip, the fourth transmission line Rin, the first output terminal Tp, the second output terminal Tn and the input terminal Tin. The positive phase electrical signal Dup and the negative phase electrical signal Dun are respectively output from the first output terminal Tp and the second output terminal Tn, and after that, are input into the re-timing circuit 131 via the positive phase transmission line Rxp and the negative phase transmission line Rxn respectively. The transmission lines Rxp and Rxn respectively have the coupling capacitors Cxp and Cxn.

The optical receiving device 11 is different from the fifth embodiment in a point that a control signal CNT from outside is input into the control device 114 and the input-side control device 117 via the input terminal Tin. The control device 114 controls the potential difference between the first transmission line Rp and the second transmission line Rn based on the control signal CNT. The input-side control device 117 controls the potential difference between the third transmission line Rip and the fourth transmission line Rip based on the control signal CNT.

In concrete, when the control signal CNT is input, that is, the voltage of the control signal CNT is high level, the control device 114 shorts between the first transmission line Rp and the second transmission line Rn. When the inputting of the control signal CNT is being stopped, that is, the voltage of the control signal CNT is low level, the control device 114 opens between the first transmission line Rp and the second transmission line Rn. When the control signal CNT is input, the input-side control device 117 shorts between the third transmission line Rip and the fourth transmission line Rin. When the inputting of the control signal CNT is being stopped, the input-side control device 117 opens between the third transmission line Rip and the fourth transmission line Rin.

For example, the signal processing device 13 generates the control signal CNT and inputs the control signal CNT into the optical receiving device 11. The signal processing device 13 predicts a timing at which the burst optical signal Su of each optical terminal device 2 arrives at the optical receiving device 11 based on individual transmission timings instructed to each optical terminal device 2, and generates the control signal CNT based on the predicted timing Therefore, the optical receiving device 11 can achieve the same function and effect as above-mentioned embodiments. The optical receiving device 11 controls the potential difference based on the control signal CNT input from outside. Therefore, the optical receiving device 11 may lack the signal detection devices 115 and 116. Therefore, the structure of the optical receiving device 11 may be simplified.

[Eighth Embodiment]

In the seventh embodiment, the coupling capacitors Cxp and Cxn used for the AC-coupling between the optical receiving device 11 and the re-timing circuit 131 are respectively provided on the transmission line Rxp and the transmission line Rxn that are out of the optical receiving device 11. However, the coupling capacitors Cxp and Cxn may be provided on the transmission lines Rip and Rin in the optical receiving device 11.

Figure 20:
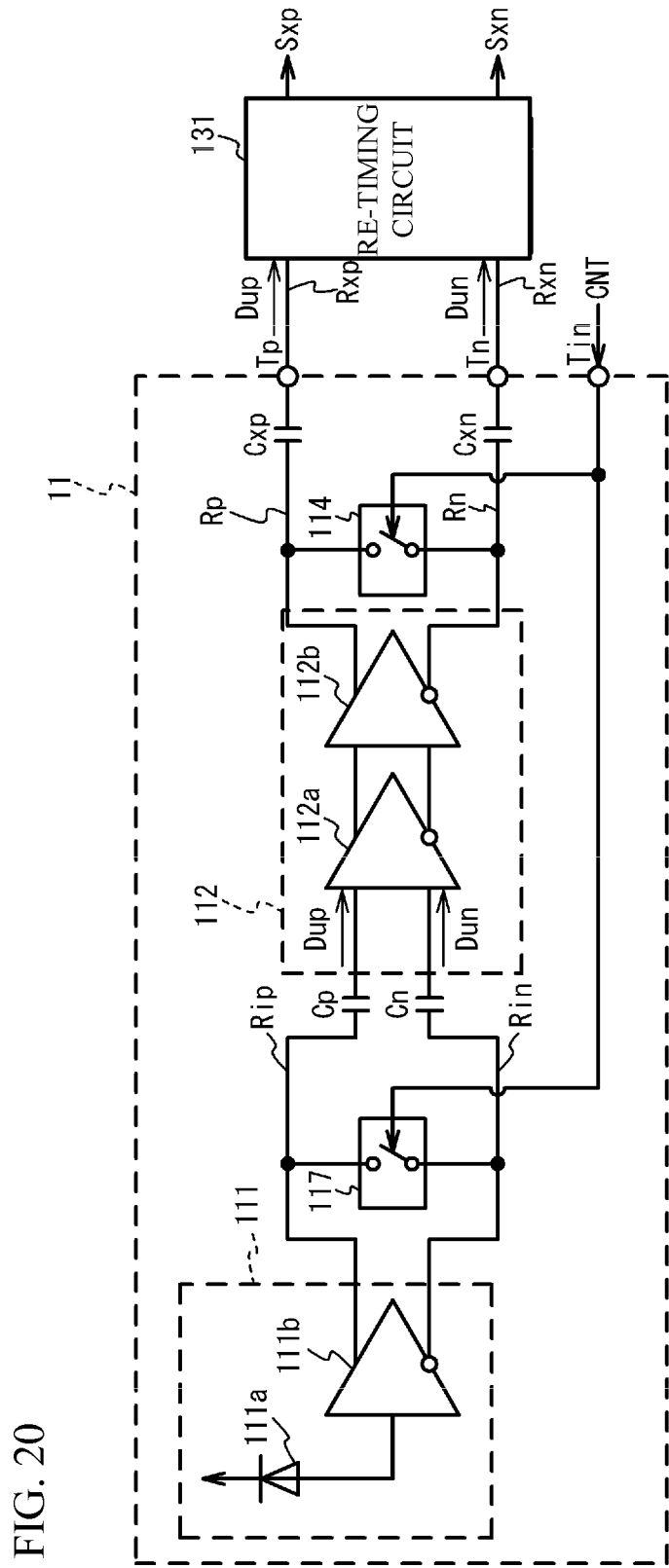
FIG. 20 illustrates a circuit diagram of an optical receiving device in accordance with an eighth embodiment.

FIG. 20 illustrates a circuit diagram of the optical receiving device 11 in accordance with an eighth embodiment. In FIG. 20, the same numerals are added to the same components as FIG. 19, and the explanation of the components are omitted.

The optical receiving device 11 has the conversion device 111, the amplification device 112, the control device 114, the input-side control device 117, the first transmission line Rp, the second transmission line Rn, the third transmission line Rip, the fourth transmission line Rin, the first output terminal Tp, the second output terminal Tn and the input terminal Tin.

The optical receiving device 11 is different from the seventh embodiment in a point that the coupling capacitors Cxp and Cxn used for the AC-coupling are respectively provided on the first transmission line Rp and the second transmission line Rn. That is, the first transmission line Rp and the second transmission line Rn respectively couple the amplification device 112 with the first output terminal Tp and the second output terminal Tn via the coupling capacitors Cxp and Cxn. In this manner, the optical receiving device 11 of the embodiment can simplify the connection with the re-timing circuit 131 by having the coupling capacitors Cxp and Cxn therein.

The control device 114 reduces a potential difference between a portion of the first transmission line Rp between the amplification device 112 and the coupling capacitor Cxp and a portion of the second transmission line Rn between the amplification device 112 and the coupling capacitor Cxn. In concrete, the control device 114 shorts between the portions of the first transmission line Rp and the second transmission line Rn in the no-signal period and opens between the portions of the first transmission line Rp and the second transmission line Rn in the period in which the burst optical signal Su is being input.

The input-side control device 117 reduces a potential difference between a portion of the third transmission line Rip between the preamble amplification device 111b and the coupling capacitor Cp and a portion of the fourth transmission line Rin between the preamble amplification device 111b and the coupling capacitor Cn in the no-signal period. In concrete, the input-side control device 117 shorts the portions of the third transmission line Rip and the fourth transmission line Rin in the no-signal period, and opens the portions of the third transmission line Rip and the fourth transmission line Rin in the period in which the burst optical signal Su is being input.

Therefore, the optical receiving device 11 of the embodiment can achieve the same function and effect as above-mentioned embodiments.

Figure 21:
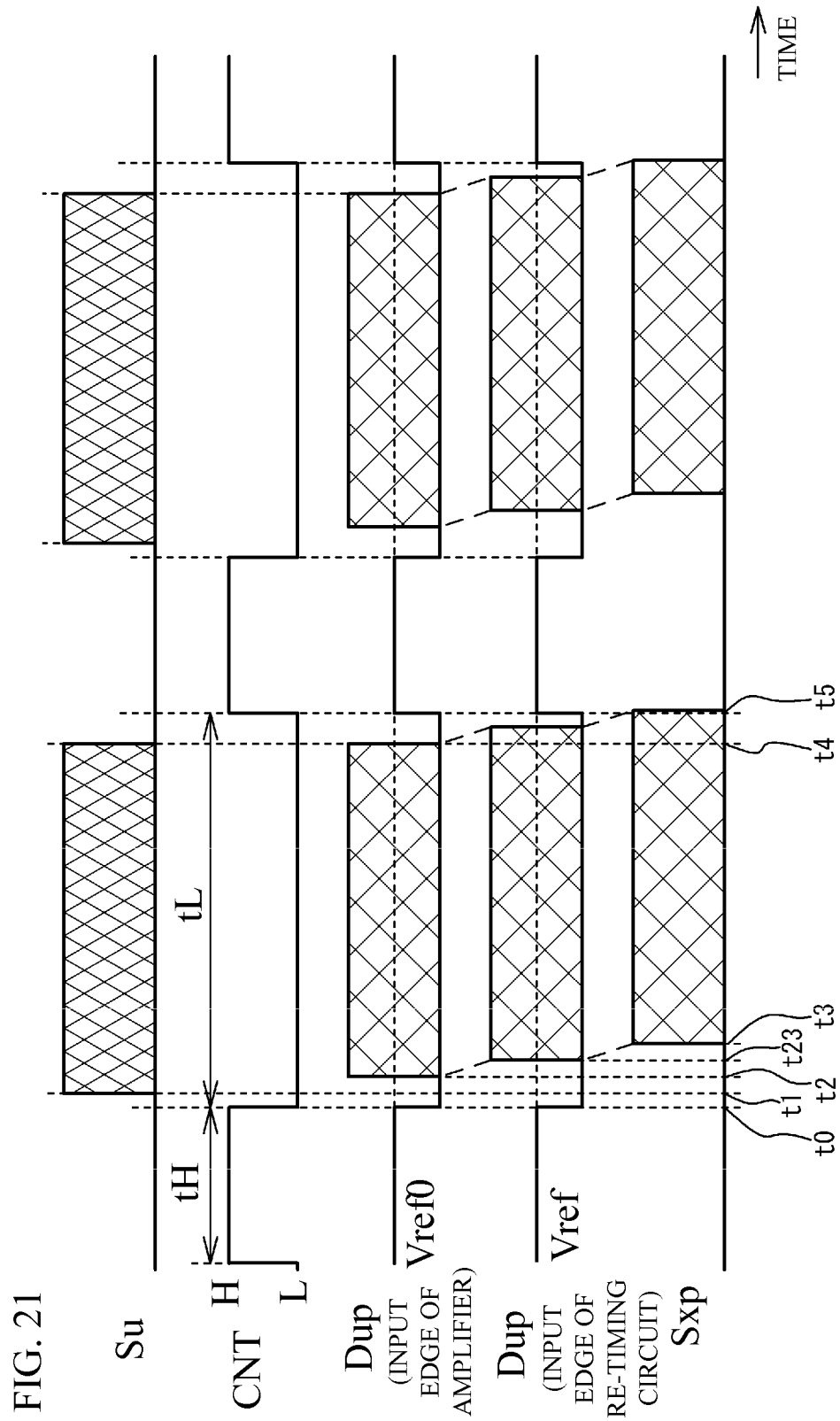
FIG. 21 illustrates a waveform diagram of a signal waveform of a seventh embodiment and an eighth embodiment.

FIG. 21 illustrates a waveform diagram of the signal waveforms of the seventh embodiment and the eighth embodiment. FIG. 21 illustrates waveforms of the burst optical signal Su and the control signal CNT. In FIG. 18, waveforms of the electrical signal Dup at the input edge of the amplification device 112a, the electrical signal Dup at the input edge of the re-timing circuit 131 and the data signal Sxp.

The level of the control signal CNT is high (H) for a period tH and is changed to low (L) at a time t0. In this case, the mode of the input-side control device 117 is changed from on to off, and the mode between the third transmission line Rip and the fourth transmission line Rin is changed from short to open. The mode of the control device 114 is changed from on to off. The mode between the first transmission line Rp and the second transmission line Rn is changed from short to open. And, the burst optical signal Su is input at the time t1.

Therefore, the fluctuation of the operation point voltage (reference voltage Vref0 and Vref) of the positive phase electrical signal Dup and the negative phase electrical signal Dun is suppressed on the first transmission line Rp, the second transmission line Rn, the third transmission line Rip and the fourth transmission line Rin. And the period TX in which the code identification is not possible is reduced. At the time t2, the positive phase electrical signal Dup and the negative phase electrical signal Dun are input into the amplification device 112a. After that, at the time t23, the positive phase electrical signal Dup and the negative phase electrical signal Dun are input into the re-timing circuit 131. And, at the time t3, the synchronized data signals Sxp and Sxn are output from the re-timing circuit 131.

At the time t4, the inputting period of the burst optical signal Su is terminated, and the no-signal period (guard time) starts. The level of the control signal CNT is low (L) for a period tL, and at the time t5, is changed to high (H). The time t5 at which the level of the control signal CNT is changed to high is after the time t4 at which the inputting period of the burst optical signal Su is terminated.

When the level of the control signal CNT is changed to high, the mode of the input-side control device 117 is changed from off to on, and the mode between the third transmission line Rip and the fourth transmission line Rin is changed from open to off. Thus, the potential of the third transmission line Rip is equal to that of the fourth transmission line Rin. The equilibrium of the operation point voltage (reference Vref0) is maintained between the third transmission line Rip and the fourth transmission line Rin.

When the level of the control signal CNT is changed to high, the mode of the control device 114 is changed from off to on, and the mode between the first transmission line Rp and the second transmission line Rn is changed from open to short. Thus, the potential of the first transmission line Rp is equal to that of the second transmission line Rn. And, the equilibrium of the operation point voltage (reference voltage Vref) is maintained between the first transmission line Rp and the second transmission line Rn.

[Ninth Embodiment]

The optical receiving devices 11 of the first to eighth embodiment are AC-coupled with the re-timing circuit 131. However, the structure is not limited. The optical receiving devices 11 may be DC-coupled with the re-timing circuit 131. In this case, the operation point voltage (reference voltage Vref) between the first transmission line Rp and the second transmission line Rn dies not fluctuate. Therefore, the control device 114 is not used.

Figure 22:
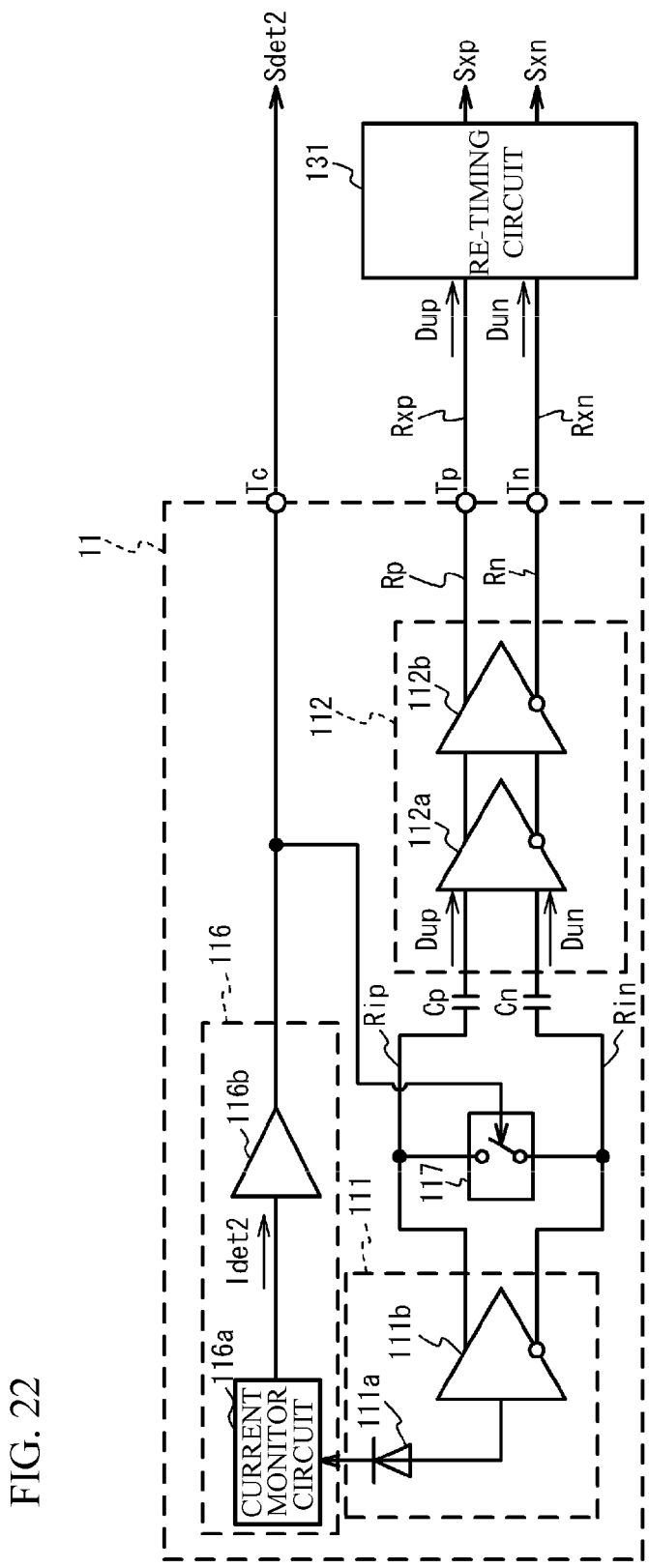
FIG. 22 illustrates a circuit diagram of an optical receiving device in accordance with a ninth embodiment.

FIG. 22 illustrates a circuit diagram of the optical receiving device 11 in accordance with a ninth embodiment. In FIG. 22 the same numerals are added to the same components as FIG. 16, and the explanation of the components is omitted.

The optical receiving device 11 has the conversion device 111, the amplification device 112, the signal detection device 116, the input-side control device 117, the first transmission line Rp, the second transmission line Rn, the third transmission line Rip, the fourth transmission line Rin, the first output terminal Tp, the second output terminal Tn and the control terminal Tc. The positive phase electrical signal Dup and the negative phase electrical signal Dun are respectively output from the first output terminal Tp and the second output terminal Tn, and after that, are input into the re-timing circuit 131 via the positive phase transmission line Rxp and the negative phase transmission line Rxn respectively. The transmission lines Rxp and Rxn respectively have the coupling capacitors Cxp and Cxn. The third transmission line Rip and the fourth transmission line Rin couple the conversion device 111 with the amplification device 112 via the coupling capacitors Cp and Cn respectively.

The optical receiving device 11 of the embodiment is different from the first to eighth embodiments, and are DC-coupled with the re-timing circuit 131. That is, the transmission lines Rxp and Rxn between the optical receiving device 11 and the re-timing circuit 131 do not have a coupling capacitor. The first transmission line Rp and the second transmission line Rn between the output buffer 112b and the first and second output terminals Tp and Tn do not have a coupling capacitor. Therefore, the outputting voltage level of the output buffer 112b is adjusted in accordance with the inputting voltage level of the re-timing circuit 131.

In this manner, in the embodiment, the DC-coupling is used between the optical receiving device 11 and the re-timing circuit 131. Therefore, the fluctuation of the operation point voltage (reference voltage Vref) between the first transmission line Rp and the second transmission line Rn does not occur.

On the other hand, the conversion device 111 is AC-coupled with the amplification device 112. That is, the third transmission line Rip and the fourth transmission line Rin between the preamble amplification device 111b and the amplification device 112a respectively have the coupling capacitors Cp and Cn. Therefore, the input-side control device 117 reduces the potential difference between the third transmission line Rip and the fourth transmission line Rin in the no-signal period as mentioned above.

Therefore, the optical receiving device 11 of the embodiment can achieve the same function and effect as the above-mentioned embodiments.

Figure 23:
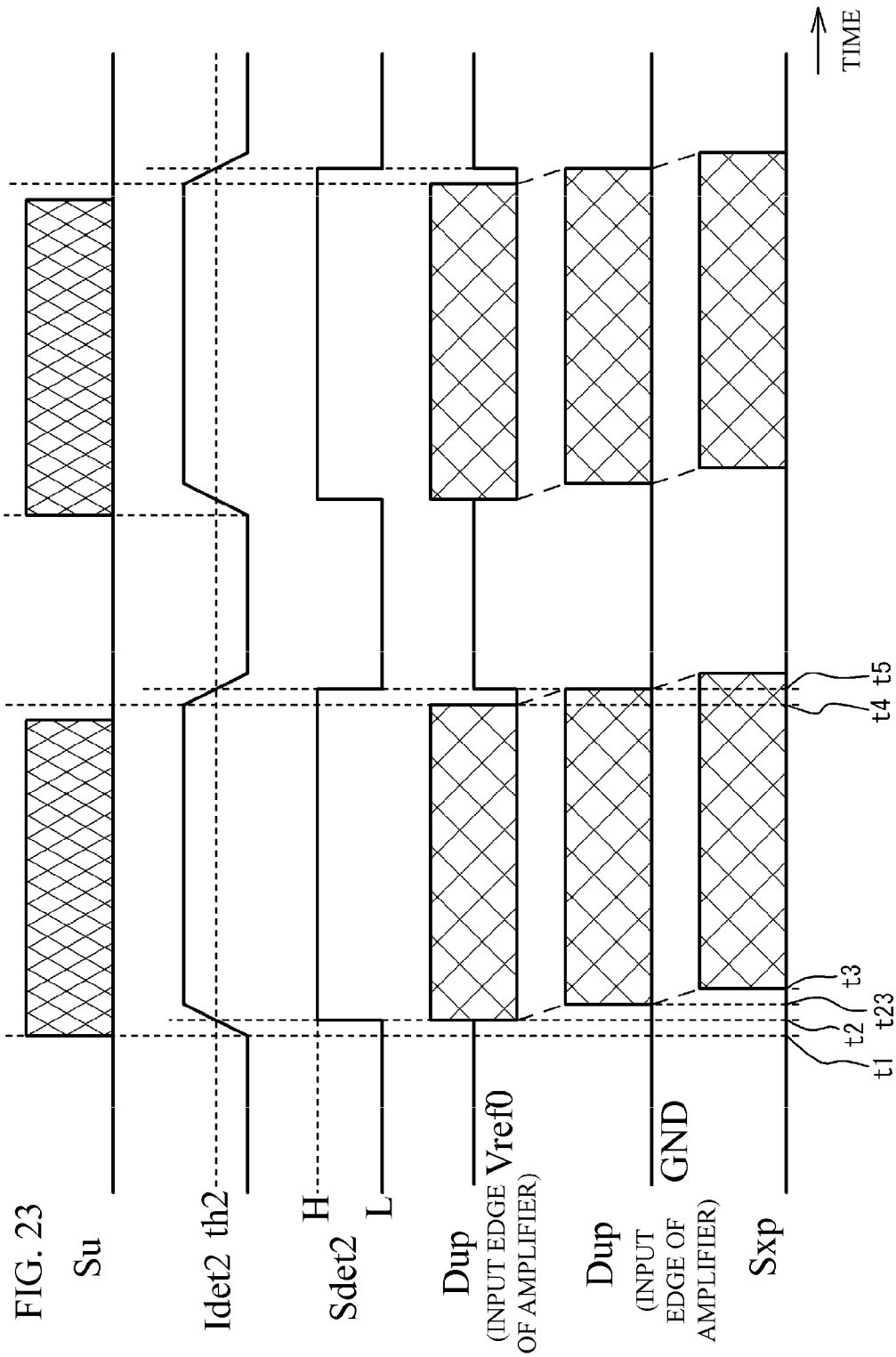
FIG. 23 illustrates a waveform diagram of a signal waveform of a ninth embodiment.

FIG. 23 illustrates a signal waveform diagram of a signal waveform of the ninth embodiment. In FIG. 23 waveforms of the burst optical signal Su, the voltage signal Idet2, and the detection information signal Sdet2 are illustrated. In FIG. 23, waveforms of the electrical signal Dup at the input edge of the amplification device 112a, the electrical signal Dup at the input edge of the re-timing circuit 131 and the data signal Sxp are illustrated. In the embodiment, the optical receiving device 11 is DC-coupled with the re-timing circuit 131. Therefore, the reference potential of the electrical signal Dup at the input edge of the re-timing circuit 131 is a ground potential GND.

When the burst optical signal Su is input at the time t1, the current output from the light-receiving element 111a increases. Therefore, the voltage level of the voltage signal Idet2 increases, and exceeds the threshold th2 at the time t2. In this case, the determination device 116b outputs the detection information signal Sdet2 to the control device 114 and the input-side control device 117. That is, the voltage level of the detection information signal Sdet2 is changed from low (L) to high (H).

When the detection information signal Sdet2 is input, the mode of the input-side control device 117 is changed from on to off. And, the mode between the third transmission line Rip and the fourth transmission line Rin is changed from short to open.

Therefore, the fluctuation of the operation point voltage (reference voltage Vref) of the positive phase electrical signal Dup and the negative phase electrical signal Dun is suppressed on the third transmission line Rip and the fourth transmission line Rin. And the period TX in which the code identification is not possible is reduced. At the time t2, the positive phase electrical signal Dup and the negative phase electrical signal Dun are input into the amplification device 112a. After that, at the time t23, the positive phase electrical signal Dup and the negative phase electrical signal Dun are input into the re-timing circuit 131. And at the time t3, the synchronized data signals Sxp and Sxn are output from the re-timing circuit 131.

When the inputting period of the burst optical signal Su is terminated and the no-signal period (guard time) starts at the time t4, the current output from the light-receiving element 111a decreases. Therefore, the voltage level of the voltage signal Idet2 decreases, and gets less than the threshold th2 at the time t5. In this case, the determination device 116b stops outputting of the detection information signal Sdet2 to the control device 114 and the input-side control device 117. That is, the voltage level of the detection information signal Sdet2 is changed from high (H) to low (L).

When the inputting of the detection information signal Sdet2 is stopped, the mode of the input-side control device 117 is changed from off to on. And, the mode between the third transmission line Rip and the fourth transmission line Rin is changed from open to short. Thus, the potential of the third transmission line Rip is equal to that of the fourth transmission line Rin. Therefore, the equilibrium of the operation point voltage (reference voltage Vref0) is maintained between the third transmission line Rip and the fourth transmission line Rin.

[Tenth Embodiment]

In the ninth embodiment, the input-side control device 117 reduces the potential difference between the third transmission line Rip and the fourth transmission line Rin based on the detection information signal Sder2 of the signal detection device 116. However, the input-side control device 117 may perform the control of the potential difference based on the control signal input from outside instead of the detection information signal Sdet2 of the signal detection device 116.

Figure 24:
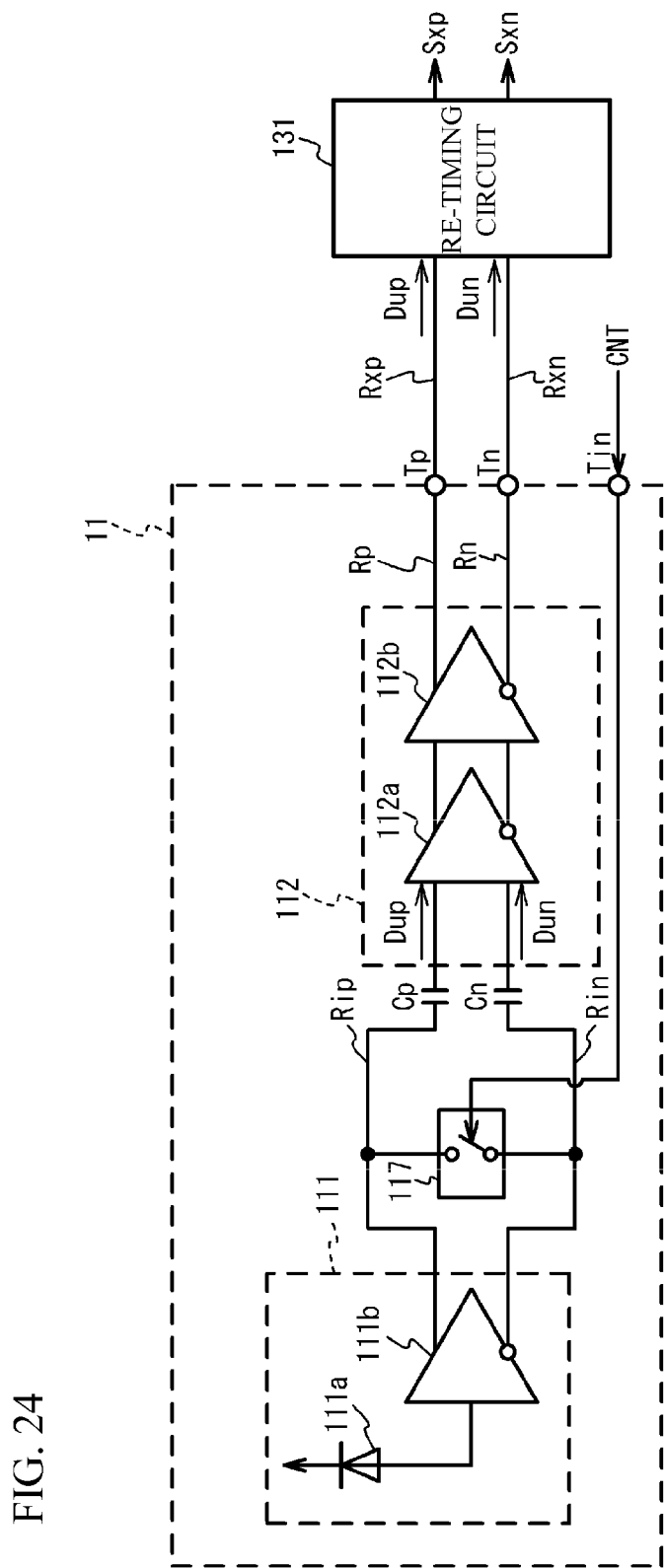
FIG. 24 illustrates a circuit diagram of an optical receiving device in accordance with a tenth embodiment.

FIG. 24 illustrates a circuit diagram of the optical receiving device 11 in accordance with a tenth embodiment. In FIG. 24, the same numerals are added to the same components as FIG. 22, and the explanation of the components is omitted.

The optical receiving device 11 has the conversion device 111, the amplification device 112, the input-side control device 117, the first transmission line Rp, the second transmission line Rn, the third transmission line Rip, the fourth transmission line Rin, the first output terminal Tp, the second output terminal Tn and the control terminal Tc. The positive phase electrical signal Dup and the negative phase electrical signal Dun are respectively output from the first output terminal Tp and the second output terminal Tn, and after that, are respectively input into the re-timing circuit 131 via the positive phase transmission line Rxp and the negative phase transmission line Rxn. The transmission lines Rxp and Rxn respectively have the coupling capacitors Cxp and Cxn. The third transmission line Rip and the fourth transmission line Rin couple the conversion device 111 with the amplification device 112 via the coupling capacitors Cp and Cn respectively.

The optical receiving device 11 is different from the ninth embodiment in a point that the control signal CNT is input into the input-side control device 117 via the input terminal Tin from outside. The input-side control device 117 controls the potential difference between the third transmission line Rip and the fourth transmission line Rin based on the control signal CNT. In concrete, when the control signal CNT is input, the input-side control device 117 shorts between the third transmission line Rip and the fourth transmission line Ri. The input-side control device 117 opens between the third transmission line Rip and the fourth transmission line Rin when the inputting of the control signal CNT is being stopped. The control signal CNT is described in the seventh embodiment.

Therefore, the optical receiving device 11 can achieve the same function and effect as the above-mentioned embodiments.

Figure 25:
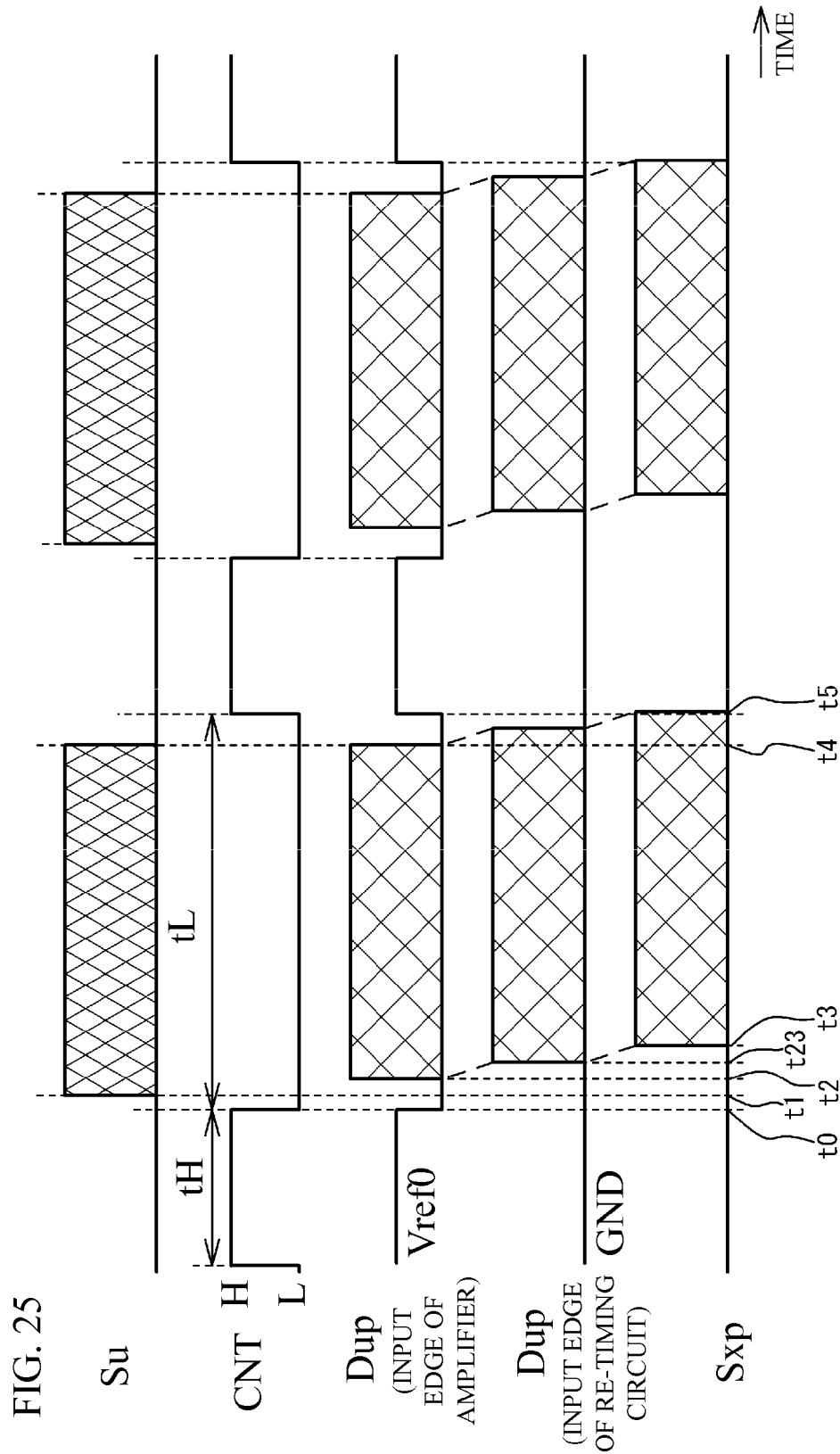
FIG. 25 illustrates a waveform diagram of a signal waveform of a tenth embodiment.

FIG. 25 illustrates a waveform diagram of a signal waveform of the tenth embodiment. In FIG. 25, waveforms of the burst optical signal Su and the control signal CNT are illustrated. In FIG. 25, waveforms of the electrical signal Dup at the input edge of the amplification device 112a, the electrical signal Dup at the input edge of the re-timing circuit 131, and the data signal Sxp are illustrated. In the embodiment, the optical receiving device 11 is DC-coupled with the re-timing circuit 131. Therefore, the reference potential of the electrical signal Dup at the input edge of the re-timing circuit 131 is the ground potential GND.

The level of the control signal CNT is high (H) in the period tH. After that, at the time t0, the level of the control signal CNT is changed to low (L). In this case, the mode of the input-side control device 117 is changed from on to off. And, the mode between the third transmission line Rip and the fourth transmission line Rin is changed from short to open. And, at the time tl, the burst optical signal Su is input.

Therefore, the fluctuation of the operation point voltage (reference voltage Vref0) of the positive phase electrical signal Dup and the negative phase electrical signal Dun is suppressed on the third transmission line Rip and the fourth transmission line Rin. And, the period TX in which code identification is not possible is reduced. At the time t2, the positive phase electrical signal Dup and the negative phase electrical signal Dun are input into the amplification device 112a. After that, at the time t23, the positive phase electrical signal Dup and the negative phase electrical signal Dun are input into the re-timing circuit 131. At the time t3, the synchronized data signals Sxp and Sxn are output from the re-timing circuit 131.

At the time t4, the inputting period of the burst optical signal Su is terminated, and the no-signal period (guard time) starts. The level of the control signal CNT is low (L) in the period tL, and after that, is changed to high (H) at the time t5. The time t5 at which the level of the control signal CNT is changed to high is after the time t4 at which the inputting period of the burst optical signal Su is terminated.

When the level of the control signal CNT is changed to high, the mode of the input-side control device 117 is changed from off to on. And, the mode between the third transmission line Rip and the fourth transmission line Rin is changed from open to short. Thus, the potential of the third transmission line Rip is equal to that of the fourth transmission line Rin. The equilibrium of the operation point voltage (reference voltage Vref0) is maintained between the third transmission line Rip and the fourth transmission line Rin.

[Eleventh Embodiment]

In the first to tenth embodiments, the control device 114 and the input-side control device 117 reduce the potential difference among the transmission lines Rp, Rn, Rip and Rin by shorting between the transmission lines Rp, Rn, Rip and Rin. However, the structure is not limited. The control device 114 and the input-side control device 117 may reduce the potential difference among the transmission lines Rp, Rn, Rip and Rin by applying a bias voltage to the transmission lines Rp, Rn, Rip and Rin in the no-signal period.

Figure 26:
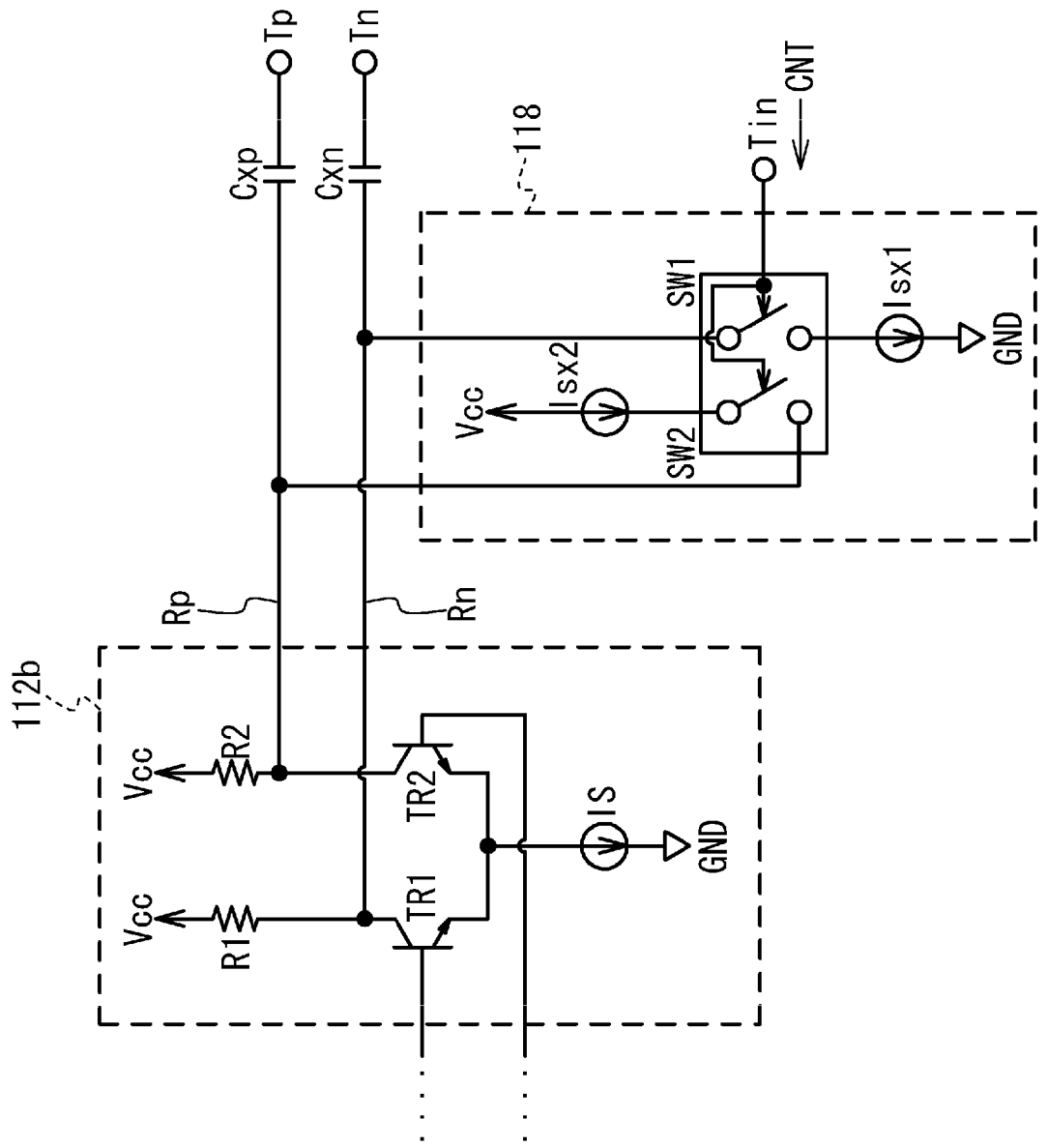
FIG. 26 illustrates a circuit diagram of an optical receiving device in accordance with an eleventh embodiment.

FIG. 26 illustrates a circuit diagram of the optical receiving device 11 in accordance with an eleventh embodiment. In FIG. 26, a circuit of a control device 118 corresponding to the input-side control device 117 of the eighth embodiment and the output buffer 112b is illustrated. In FIG. 26, the same numerals are added to the same components as FIG. 6, and the explanation of the components is omitted.

The control device 118 has a first switch element SW1, a second switch element SW2, a first constant current source ISx1, and a second constant current source ISx2. The first switch element SW1 is, for example, a transistor. A first edge of the first switch element SW1 is coupled with the first transmission line Rp, and a second edge of the first switch element SW2 is coupled with the reference potential GND via the first constant current source ISx1. The second switch element SW2 is, for example, a transistor. A first edge of the second switch element SW2 is coupled with the second transmission line Rn, and a second edge of the second switch element SW2 is coupled with the power supply Vcc via the second constant current source ISx2.

The on-off of the first switch element SW1 and the second switch element SW2 is controlled in accordance with the control signal CNT that is input via the input terminal Tin from outside. The control signal CNT is described in the seventh embodiment.

The control device 118 applies a bias voltage to the first transmission line Rp and the second transmission line Rn so that the potential difference between the first transmission line Rp and the second transmission line Rn is reduced. In concrete, the mode of the first switch element SW1 and the second switch element SW2 is on in accordance with the control signal CNT in the no-signal period. Therefore, the first transmission line Rp is coupled with the second constant current source ISx2, and the second transmission line Rn is coupled with the first constant current source ISx1.

In this case, the first constant current source ISx1 extracts a half of a current flowing in the no-signal time from an inverting terminal of the output buffer 112b to the control device 118. The second constant current source ISx2 supplies a half of a current flowing in the no-signal period to a normal terminal of the output buffer 112b. The first constant current source ISx1 and the second constant current source ISx2 are not limited. Another current value achieving the equilibrium of the operation point voltage (reference voltage Vref0) of the first transmission line Rp and the second transmission line Rn may be supplied.

On the other hand, the control device 118 stops applying of the bias voltage to the first transmission line Rp and the second transmission line Rn in the period in which the burst optical signal Su is being input. In concrete, the mode of the first switch element SW1 and the second switch element SW2 is off in accordance with the control signal CNT in the inputting period of the burst optical signal Su. Therefore, the first transmission line Rp is electrically separated from the first constant current source ISx1. The second transmission line Rn is electrically separated from the second constant current source ISx2.

In this manner, the control device 118 reduces the potential difference between the first transmission line Rp and the second transmission line Rn in the no-signal period by applying the bias voltage to the first transmission line Rp and the second transmission line Rn. Therefore, the operation point voltage (reference voltage Vref0) of the first transmission line Rp and the second transmission line Rn is maintained to be equilibrated with high accuracy.

Therefore, the optical receiving device 11 of the embodiment can achieve the same function and effect as the above-mentioned embodiments. The structure of the control device 118 can be applied to not only the control device 114 but also the input-side control device 117.

As mentioned above, the optical receiving device 11 of the embodiment has the conversion device 111, the amplification device 112, the first output terminal Tp, the second output terminal Tn, the first transmission line Rp, the second transmission line Rn and the control device 114. The conversion device 111 converts the input burst optical signal Su into the positive phase electrical signal Dup and the negative phase electrical signal Dun. The amplification device 112 amplifies the positive phase electrical signal Dup and the negative phase electrical signal Dun.

The positive phase electrical signal Dup and the negative phase electrical signal Dun are respectively output from the first output terminal Tp and the second output terminal Tn. The first transmission line Rp and the second transmission line Rn respectively couple the amplification device 112 with the first output terminal Tp and the second output terminal Tn. The positive phase electrical signal Dup and the negative phase electrical signal Dun are respectively transmitted via the first transmission line Rp and the second transmission line Rn. The control device 114 reduces the potential difference between the first transmission line Rp and the second transmission line Rn in the no-signal period that is provided between burst optical signals.

The conversion device 111 converts the input burst optical signal Su into the positive phase electrical signal Dup and the negative phase electrical signal Dun. The amplification device 112 amplifies the positive phase electrical signal Dup and the negative phase electrical signal Dun. The positive phase electrical signal Dup and the negative phase electrical signal Dun are respectively transmitted via the first transmission line Rp and the second transmission line Rn and are respectively output from the first output terminal Tp and the second output terminal Tn. Therefore, the burst optical signal Su is output to another circuit that is positioned behind the optical receiving device 11 and is processed.

The control device 114 reduces the potential difference between the first transmission line Rp and the second transmission line Rn in the no-signal period that is provided between burst optical signals. Therefore, even if the coupling capacitors Cxp and Cxn are respectively provided on the first transmission line Rp and the second transmission line Rn or on the transmission lines Rxp and Rxn between the first and second output terminals Tp and Tn and another circuit, each voltage level of the first transmission line Rp and the second transmission line Rn is maintained to be equilibrated.

Therefore, when the burst optical signal Su is input, the reference value of the voltage level of the positive phase electrical signal Dup and the negative phase electrical signal Dun fluctuates and is unequilibrated. Therefore, the period TX in which the data of the burst optical signal is not identified is reduced. Therefore, it is possible to reduce the preamble section in the burst optical signal Su and increase band efficiency. In this case, the capacitance value of the coupling capacitors Cxp and Cxn is not adjusted. Therefore, it is possible to achieve both the band efficiency and the transmission quality at a given level.

Therefore, the optical receiving device 11 can achieve the band efficiency effectively.

The optical receiving device 11 in accordance with another embodiment has the conversion device 111, the amplification device 112, the third transmission line Rip, the fourth transmission line Rin and the control device (input-side control device) 117. The conversion device 111 converts the input burst optical signal Su into the positive phase electrical signal Dup and the negative phase electrical signal Dun. The amplification device 112 amplifies the positive phase electrical signal Dup and the negative phase electrical signal Dun.

The third transmission line Rip and the fourth transmission line Rin couple the conversion device 111 with the amplification device 112 via the coupling capacitors Cp and Cn respectively. The positive phase electrical signal Dup and the negative phase electrical signal Dun are respectively transmitted via the third transmission line Rip and the fourth transmission line Rip. The input-side control device 117 reduces the potential difference between a portion of the third transmission line Rip between the conversion device 111 and the capacitor Cp and a portion of the fourth transmission line Rin between the conversion device 111 and the capacitor Cn in the no-signal period.

The optical receiving device 11 has the same structure as the above-mentioned optical receiving devices 11, and thereby have the same function and effect.

The transmission device (optical terminal station device) 1 has the conversion device 111, the amplification device 112, the fifth transmission lines Rp and Rxp, the sixth transmission lines Rn and Rxn, the control device 114 and the signal processing device 13. The conversion device 111 converts the input burst optical signal Su to the positive phase electrical signal Dup and the negative phase electrical signal Dun. The amplification device 112 amplifies the positive phase electrical signal Dup and the negative phase electrical signal Dun.

The signal processing device 13 process the positive phase electrical signal Dup and the negative phase electrical signal Dun that are amplified by the amplification device 112. The fifth transmission lines Rp and Rxp and the sixth transmission lines Rn and Rxn couple the amplification device 112 with the signal processing device 13 via the coupling capacitors Cxp and Cxn respectively. The positive phase electrical signal Dup and the negative phase electrical signal Dun are transmitted via the fifth transmission lines Rp and Rxp and the sixth transmission lines Rn and Rxn.

The control device 114 reduces the potential difference between a portion of the fifth transmission lines Rp and Rxp between the amplification device 112 and the capacitor Cxp and a portion of the sixth transmission lines Rn and Rxn between the amplification device 112 and the capacitor Cxp in the no-signal period that is provided between burst optical signals Su.

The transmission device 1 has the same structure as the optical receiving device 11, and thereby have the same function and effect.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various change, substitutions, and alterations could be made hereto without departing from the spirit and scope of the invention.

What is claimed is:

1. An optical receiving device comprising:
   a conversion device that converts an input burst optical signal into a positive phase electrical signal and a negative phase electrical signal;

an amplification device that amplifies the positive phase electrical signal and the negative phase electrical signal;

a first output terminal that outputs the positive phase electrical signal from the amplification device to a signal processing device via a first capacitor;

a second output terminal that outputs the negative phase electrical signal from the amplification device to the signal processing device via a second capacitor, the signal processing device processing the positive phase electrical signal and the negative phase electrical signal;

a first transmission line that couples the amplification device with the first capacitor and transmits the positive phase electrical signal;

a second transmission line that couples the amplification device with the second capacitor and transmits the negative phase electrical signal; and a control device that reduces a potential difference between the first transmission line and the second transmission line in a no-signal period that is provided between burst optical signals.

2. The optical receiving device as claimed in claim 1, wherein:

the conversion device outputs the positive phase electrical signal through a first output terminal, and outputs the negative phase electrical signal through a second output terminal, the first transmission line couples the amplification device with the first output terminal via the first capacitor;

the second transmission line couples the amplification device with the second output terminal via the second capacitor;

the control device reduces the potential difference between a portion of the first transmission line between the amplification device and the first capacitor and a portion of the second transmission line between the amplification device and the second capacitor in the no-signal period.

3. The optical receiving device as claimed in claim 1 further comprising a detection device that detects a current output from the conversion device when the burst optical signal is input and outputs a detection signal to the control device, wherein the control device reduces the potential difference between the first transmission line and the second transmission line based on the detection signal.

4. The optical receiving device as claimed in claim 1, wherein the control device shorts between the first transmission line and the second transmission line in the no-signal period and opens between the first transmission line and the second transmission line in a period in which the burst optical signal is being input.

5. The optical receiving device as claimed in claim 1, wherein the control device applies a bias voltage to the first transmission line and the second transmission line so that the potential difference between the first transmission line and the second transmission line is reduced in the no-signal period, and stops applying the bias voltage to the first transmission line and the second transmission line during the period in which the burst optical signal is being input.

6. A transmission device comprising:

a conversion device that converts an input burst optical signal into a positive phase electrical signal and a negative phase electrical signal;

an amplification device that amplifies the positive phase electrical signal and the negative phase electrical signal;

a signal processing device that processes the positive phase electrical signal and the negative phase electrical signal that are amplified by the amplification device;

a first transmission line that couples the amplification device with the signal processing device via a first capacitor and transmits the positive phase electrical signal;

a second transmission line that couples the amplification device with the signal processing device via a second capacitor and transmits the negative phase electrical signal; and a control device that reduces a potential difference between a portion of the first transmission line between the amplification device and the first capacitor and a portion of the second transmission line between the amplification device and the second capacitor in a no-signal period that is provided between burst optical signals.

7. The transmission device as claimed in claim 6 further comprising a detection device that detects a current output from the conversion device when the burst optical signal is input and outputs a detection signal to the control device, wherein the control device reduces the potential difference between the portion of the first transmission line between the amplification device and the first capacitor and the portion of the second transmission line between the amplification device and the second capacitor based on the detection signal.

8. The transmission device as claimed in claim 6, wherein the control device shorts between the portion of the first transmission line between the amplification device and the first capacitor and the portion of the second transmission line between the amplification device and the second capacitor in the no-signal period, and opens between the portions in a period in which the burst optical signal is being input.

9. The transmission device as claimed in claim 6, wherein the control device applies a bias voltage to the portion of the first transmission line between the amplification device and the first capacitor and the portion of the second transmission line between the amplification device and the second capacitor so that the potential difference between the portions is reduced in the no-signal period, and stops applying the bias voltage to the portions in a period in which the burst optical signal is being input.

10. An optical receiving device comprising:

a conversion device that converts an input burst optical signal into a positive phase electrical signal and a negative phase electrical signal;

an amplification device that amplifies the positive phase electrical signal and the negative phase electrical signal;

a first output terminal that outputs the positive phase electrical signal;

a second output terminal that outputs the negative electrical signal;

a first transmission line that couples the amplification device with the first output terminal and transmits the positive phase electrical signal;

a second transmission line that couples the amplification device with the second output terminal and transmits the negative phase electrical signal;

a signal detection device that detects inputting of the input burst optical signal based on voltage levels of the positive phase electrical signal and the negative phase electrical signal; and a control device that connects together the first transmission line and the second transmission line, and thereby short circuits between the first transmission line and the second transmission line, in a no-signal period between burst optical signals, and disconnects the first transmission line and the second transmission line from each other in a period in which the burst optical signal is being input according to the detection of the signal detection device.

* * * * *